United States Patent
Hyde

(10) Patent No.: US 12,259,890 B2
(45) Date of Patent: Mar. 25, 2025

(54) REAL-TIME SIGNAL DISCOVERY

(71) Applicant: CRFS Limited, Cambridge (GB)

(72) Inventor: William Hyde, Cambridgeshire (GB)

(73) Assignee: CRFS Limited, Cambridge (GB)

( * ) Notice: Subject to any disclaimer, the term of this patent is extended or adjusted under 35 U.S.C. 154(b) by 0 days.

(21) Appl. No.: 18/217,837

(22) Filed: Jul. 3, 2023

(65) Prior Publication Data

US 2024/0419670 A1   Dec. 19, 2024

(30) Foreign Application Priority Data

Jun. 14, 2023 (GB) .................................... 2308875

(51) Int. Cl.
| | | |
|---|---|---|
| *G06F 16/24* | (2019.01) | |
| *G06F 16/22* | (2019.01) | |
| *G06F 16/2455* | (2019.01) | |
| *G06F 16/2458* | (2019.01) | |
| *G06F 16/25* | (2019.01) | |

(52) U.S. Cl.
CPC .... *G06F 16/24568* (2019.01); *G06F 16/2246* (2019.01); *G06F 16/2477* (2019.01); *G06F 16/25* (2019.01)

(58) Field of Classification Search
CPC ........... G06F 16/24568; G06F 16/2246; G06F 16/2477; G06F 16/25
See application file for complete search history.

(56) References Cited

U.S. PATENT DOCUMENTS

| | | |
|---|---|---|
| 8,078,394 B2 | 12/2011 | Wang et al. |
| 2021/0019289 A1* | 1/2021 | Pang .................. G06F 16/2477 |
| 2022/0197904 A1* | 6/2022 | Gillis ................. G06F 16/2455 |

FOREIGN PATENT DOCUMENTS

| | | |
|---|---|---|
| EP | 3007081 B1 | 3/2019 |
| WO | 20210171018 A1 | 9/2021 |

OTHER PUBLICATIONS

G. Noël et al. "The Po-tree: a Real-time Spatiotemporal Data Indexing Structure", Developments in Spatial Data Handling 2005, pp. 259-270, 11th International Symposium on Spatial Data Handling.

* cited by examiner

*Primary Examiner* — Apu M Mofiz
*Assistant Examiner* — Cindy Nguyen
(74) *Attorney, Agent, or Firm* — Burr & Forman LLP

(57) ABSTRACT

A method is described which includes receiving a time series of radio data (S1). The method includes, for each of a plurality of buffer periods, at the end of a most recently elapsed buffer period, analysing the radio data of that buffer period to detect signals (S2). The method also includes, in response to detecting one or more signals ending within that buffer period (S4|Yes), determining a start time and an end time of that signal, and one or more signal properties corresponding to that signal, the signal properties including at least a duration, and storing (S5) that signal to a detailed database (DD) and a summary database (SD). Methods of querying the summary database (SD) and detailed database (AD) are also described, along with apparatuses for carrying out the methods.

20 Claims, 16 Drawing Sheets

REAL-TIME SIGNAL DISCOVERY

BACKGROUND

When large volumes of data (e.g. hundreds of Gb or more than 1Tb) are collected, methods for analysing and displaying the data can be used to assist a user in finding and/or reviewing desired data. For example, a dataset might include gigabytes, terabytes or petabytes of raw data. Methods of data-reduction employed may include pre-processing, index building, and hierarchical searching.

For example, U.S. Pat. No. 8,078,394 B2 describes processing Global Positioning System, GPS, data into a track of spatially-partitioned segments such that each segment has a cell. Each cell has an associated temporal index into which data for the segments of the cell are inserted.

In another example, G. Noël et. al. "The P0-tree: a Real-time Spatiotemporal Data Indexing Structure", Developments in Spatial Data Handling 2005, pp 259-270, 11th International Symposium on Spatial Data Handling, describes indexing measurement data from sensors using a KD tree index for the sensor locations, with spatial nodes corresponding to each sensor linked to a modified B+ tree time index structure for measurements from that sensor.

EP 3007081 B1 describes methods employing a spatial tree index linked to a number of time tree indices.

In other applications, a spatial component of indexing may be omitted and only temporal indexing may be needed.

This problem may be particularly acute in the area of broad-spectrum radio monitoring and analysis. WO 2021/171018 A1 describes methods enabling indexing, aggregation and even browsing of time series of data, including radio IQ data, in real-time without interrupting reception and storage of the time series of data.

SUMMARY

According to a first aspect of the invention, there is provided a method including receiving a time series of radio data. The method also includes, for each of a plurality of buffer periods, at the end of a most recently elapsed buffer period, analysing the radio data of that buffer period to detect signals. The method also includes, in response to detecting one or more signals ending within that buffer period, determining a start time and an end time of that signal, and one or more signal properties corresponding to that signal, the signal properties including at least a duration, and storing that signal to a detailed database and a summary database. The detailed database includes a plurality of levels. Each level includes one or more detailed nodes, the detailed nodes within each level sub-dividing time into consecutive detailed node periods. Storing a signal to the detailed database includes storing the signal properties corresponding to that signal into the lowest level available detailed node corresponding to a detailed node time period encompassing the start time and end time of that signal. The summary database includes an auxiliary database and a tree-structure of summary nodes having a plurality of levels. The summary nodes at each level correspond to consecutive summary node periods of equal length. Each summary node stores a summary data structure which stores, for each unique combination of quantised signal property values, a count of the number of signals corresponding to the respective summary node period which have that unique combination of quantised signal property values. Storing a signal to the summary database includes, at each level of the summary database, updating, based on the signal properties, the summary data structures of one or more summary nodes having summary node periods overlapping the duration of that signal, or storing the signal properties corresponding to that signal in the auxiliary database.

The method is computer implemented. The method may be executed by a data processing apparatus including one or more digital electronic processors communicatively coupled to random-access memory and computer readable storage. The data processing apparatus may also include one or more radio receivers which receive the time series of data.

The summary database may include, or take the form of, a binary tree index. The summary database may include, or take the form of, a trinary tree index. The summary database may include, or take the form of, a ternary tree index. The summary database may include, or take the form of, an N-ary tree index, in other words, each summary node may have a number, N, of descendent (or child) nodes in the level below.

The auxiliary database may have the same structure as the detailed database.

The leaf node period corresponding to each summary node at the leaf (lowest) level may also be referred to as a "base time period".

The summary data structure may take the form of a P-dimensional histogram (with P a positive integer). In other words, a P-dimensional array parameterised by the signal properties and storing the respective counts. Since a large number of the entries of such a P-dimensional array may be zero, for efficiency and to save memory space the data structure is preferably formatted as a list of "coordinates" in the form of a unique combination of the quantised signal property values, each such coordinate having a corresponding count of greater than or equal to one. More preferably, when executed using a digital electronic processor, the summary data structure may be stored in memory as a hashmap.

Receiving the time series of radio data may take the form of obtaining the time series of data. For example, the time series of ratio data may be obtained from one or more radios.

The quantisation of signal property values for the purposes of the summary data structure may alternatively be described as binning. The quantisation (or binning) need not be the same at each level of the summary database. For example, the quantisation (or binning) may become coarser (larger bins) as the level of the summary database increases.

The time series of radio data may be received and stored in real time. The detection of signals and storage of detected signals to the detailed database and summary database may occur at the end of each buffer period without interrupting the reception and storage of the time series of radio data.

This may be enabled because detailed databases and summary databases as described herein are built up sequentially based on the most recently received data, and require no, or only minimal, changes to previously generated nodes of the respective databases. In this way, indexing of the received time series of radio data can keep up with the reception of data, allowing near immediate browsing and analysis once collection is completed. Additionally, in some examples, the already generated sections of the detailed database and the summary database may be used to implement browsing, querying and analysis of data during the reception of the time series of radio data, and without interruption. In this way an operator monitoring a radio spectrum in a region/area may obtain real-time insights into what is occurring, without interrupting recording of the time series and potentially missing signal detections.

The signal properties may include one of more of a minimum frequency, a maximum frequency, a signal bandwidth and/or a centre frequency. The minimum frequency may also be referred to as the "start" frequency. The maximum frequency may also be referred to as the "end" frequency. The signal properties may further include an integrated signal power. The signal properties may further include any parameter or parameters which may be calculated based on the radio data corresponding to a signal.

Each detailed node may store up to a threshold number of signals. The threshold number of signals stored by each detailed node may be predetermined. The threshold number of signals stored by each detailed node may be determined by a user. The threshold number of signals for each detailed node may depend on the corresponding level of that detailed node.

Each level of the detailed database may include one active detailed node having a node start time, and any number of closed detailed nodes, each having a node start time and a node end time defining the corresponding detailed node period. Storing a signal to the detailed database may include, starting from the lowest level of the detailed database, searching successively increasing levels of the detailed database until an active detailed node at the searched level has a node start time before the start time of that signal, and in response storing that signal to the active detailed node at the searched level. Storing a signal to the detailed database may also include, in response to the active detailed node at the searched level is now storing a number of signals equal to the corresponding threshold number of signals: closing the active detailed node at the searched level, assigning the end time of that signal as the node end time; and opening a new active detailed node at the searched level, assigning the end time of that signal as the node start time.

If the search reaches the current maximum level, then the method may further include increasing the maximum level by one and opening a first detailed node for the new maximum level as an active node. The first detailed node at each level may have the same start time, corresponding to the beginning of the time series of radio data.

Alternatively, the detailed database may take the form of an N-ary tree structure. The number of signals stored to each detailed node may be unlimited, and storing a signal to the detailed database may take the form of, starting from the lowest level of the detailed database, searching successively increasing levels of the detailed database until the lowest level available detailed node period encompassing the respective start and end of that signal is found, and storing the signal to the corresponding detailed node. The detailed database in the form of an N-ary tree structure may be built in real-time using the methods described in relation to FIGS. 2 to 4 of WO 2021/171018 A1.

Storing a signal to the detailed database may also include storing the corresponding time series of radio data to the same detailed node as the signal properties. The corresponding time series of radio data may include, or take the form of, IQ data. The corresponding time series of radio data may include, or take the form of, pairs of frequencies and corresponding power values. Alternatively, the signal properties may include a pointer to the time series of radio data corresponding to that signal.

The summary database may include, at the lowest level, up to a number $N_b$ of active leaf summary nodes corresponding to a summary buffer period, and any number of closed leaf summary nodes corresponding to earlier summary node periods. Storing a signal to the summary database may include:

a. in response to the start and end time of that signal are wholly within the summary buffer period, updating, based on the signal property values of that signal, the summary data structures of every active leaf summary node having a summary node period overlapping the duration of that signal;

b. in response to the end time of that signal is within the summary buffer period and the start time of that signal is before the summary buffer period, storing the signal properties corresponding to the signal into the auxiliary database;

c. in response to the end time of that signal is after the summary buffer period:
   closing the oldest active leaf summary node and propagating the corresponding summary data structure to all higher level summary nodes from which the oldest active leaf summary node is a descendant, wherein each summary node only counts that signal once in the respective summary data structure;
   opening a new active leaf summary node as the most recent active leaf summary node in the summary buffer period;

d. Steps a. to c. may be iterated until either:
   the signal property values of the signal are added to every active leaf summary node having a summary node period overlapping the duration of that signal; or
   the signal properties corresponding to that signal are stored into the auxiliary database.

The condition that each summary node only counts each signal once in the respective summary data structure may be enforced using carry-over data stored by each summary node. The carry-over data may include, or take the form of, for each unique combination of quantised signal property values, a carry-over count of the number of signals which have that unique combination of quantised signal property values and which correspond to the respective time period and the preceding time period. When data of a summary node is propagated to the next level up, the carry-over data may be included. Alternatively, any other suitable method for propagating the summary data structures to higher levels whilst avoiding double counting may be used.

Each level of the summary database may include one active summary node having a node start time, and any number of closed detailed nodes. The active summary node may be the most recent. Each summary node may have a node start time and a node end time defining the corresponding summary node period. The auxiliary database may include, or take the form of, an interval structure corresponding to each level of the summary database. Storing a signal to the summary database may include, starting from the lowest level, searching successively increasing levels of the summary database, and at each level:

e. in response to the start and end time of that signal are within the summary node period corresponding to the active summary node at the searched level, adding the signal property values of that signal to the summary data structure of the active summary node at the searched level;

f. in response to the start time of that signal is within the summary node period corresponding to the active summary node at the searched level and the end time is outside the summary node period:
   closing the active summary node at the searched level and propagating the corresponding summary data structure to all higher level summary nodes from which the active summary node at the searched level is a descendant;

opening a new active summary node at the searched level and returning to step e.;

g. in response to the end time of the signal is within the summary node period corresponding to the active summary node at the searched level and the start time is outside the summary node period:

adding the signal data to the interval structure corresponding to the searched level; and increasing the searched level by one.

Each level of the summary database may include one active summary node having a node start time, and any number of closed detailed nodes. The active summary node may be the most recent. Each summary node may have a node start time and a node end time defining the corresponding summary node period. The auxiliary database may include, or take the form of, an interval structure corresponding to each level of the summary database. Storing a signal to the summary database may include:

h. in response to the start and end time of that signal are within the summary node period corresponding to the active leaf summary node, adding the signal property values of the signal to the summary data structure of the active leaf summary node;

i. in response to the start time of that signal is within the summary node period corresponding to the active summary node at the searched level and the end time is outside the summary node period:

closing the active recent leaf summary node and propagating the corresponding summary data structure to all higher level summary nodes from which the active leaf summary node is a descendant;

opening a new active leaf summary node and returning to step h.;

j. in response to the end time of the signal is within the summary node period corresponding to the active summary node at the searched level and the start time is outside the summary node period:

adding the signal data to the interval structure corresponding to the leaf level; and adding the signal data to a propagation list stored in the active leaf summary node.

Propagating the corresponding summary data structure to all higher level summary nodes from which the active leaf summary node is a descendant may include, at each level, in response to receiving a propagation list from the descendant level, for each signal stored in the propagation list: if the start and end time of that signal are within the summary node period of the active summary node at that level, adding the signal property values of that signal to the corresponding summary data structure; or otherwise, adding that signal to the propagation list of the active summary node at that level and to the interval corresponding to that level.

Each summary node and each detailed node may be read-only once the current time is after the corresponding respective node period. Read-only status need not be explicitly set, instead, this may correspond to the closed nodes simply not requiring access or modification unless queried.

The method may also include receiving a query including query fields. The query fields may include a query start time, a query end time and one or more ranges of signal properties. In response to meeting a condition based on the query fields, the query may be processed using the summary nodes of the summary database. Otherwise, if the condition is not met, the query may be processed using the detailed nodes of the detailed database.

The difference between the query start time and the query end time may be a query time period. The condition may include, or take the form of, whether the query time period exceeds a query period threshold. The query period threshold may be predetermined. The query period threshold may be dynamically determined, for example, based on the processing power of hardware executing the method. The query period threshold may be user specified.

The condition may include, or take the form of, whether an approximation of the number of signals within the query exceeds a certain threshold. This threshold may be dynamically determined, for example, based on the processing power of hardware executing the method. The threshold may alternatively be user specified.

According to a second aspect of the invention, there is provided a method of querying a detailed database and summary database generated using the method of the first aspect. The method includes receiving a query comprising query fields. The query fields including at least a query start time, a query end time and one or more ranges of signal properties. The difference between the query start time and the query end time is a query time period. The method includes, in response to meeting a condition based on the query fields, processing the query using the summary database, otherwise, processing the query using the detailed database.

The number of ranges of signal properties need not be equal to the number of signal properties. In other words, the query may be based on only a subset of the signal properties.

The condition may include, or take the form of, whether the query time period exceeds a query period threshold. The query period threshold may be predetermined. The query period threshold may be dynamically determined, for example, based on the processing power of hardware executing the method. The query period threshold may be user specified.

The condition may include, or take the form of, whether an approximation of the number of signals within the query exceeds a certain threshold. This threshold may be dynamically determined, for example, based on the processing power of hardware executing the method. The threshold may alternatively be user specified.

Processing the query using the detailed database may include starting from the lowest level of the detailed database, searching successively increasing levels of the detailed database and adding to a detailed query result each signal which matches all the query fields, and outputting the detailed query result.

A signal may match all of the query fields if it has a start time after the query start time, has an end time before the query end time, and has signal properties within all of the received one or more ranges of signal properties.

The detailed query result may include, or take the form of, a list of the start time, end time and signal properties of each signal found in the detailed database matching the query fields.

The method may include aggregating one or more signal properties stored in the detailed query result. The signal properties to be aggregated may be predetermined. The signal properties to be aggregated may be selected by a user when preparing the query. Signal properties may be aggregated to generate, based on the signal properties stored in the query result, one or more of histograms, bar charts scatter plots, surface plots and so forth.

Aggregating may include using the detailed query result to populate an aggregated data structure which stores, for each unique combination of a subset of the quantised signal property values, a count of the number of signals in the detailed query result which have that unique combination of the subset of the quantised signal property values.

The aggregation of one or more signal properties may be updated every time a new signal matching the query fields is found in the detailed database and added to the detailed query result. Alternatively, the aggregation of one or more signal properties may be updated in response to the number of results added to the detailed query result since last updating the aggregation of one or more signal properties is equal to a threshold value. The detailed query result may be reset after updating the aggregation of one or more signal properties of the one or more query result structures. In other words, the aggregation of one or more signal properties may be updated once a threshold number of new results have been added to the list, and the list may then be restarted.

Processing the query using the summary database may include determining, based on the query time period, a query processing level of the summary database. Processing the query using the summary database may include, for each summary node at the query processing level having a summary node period overlapping the query time period, adding any entry in the corresponding summary data structure which matches the query fields to a summary query result. Processing the query using the summary database may include searching the auxiliary database and adding any signal matching the query fields to the summary query result. Processing the query using the summary database may include outputting the summary query result.

The query processing level may be a level of the summary database for which the time period corresponding to the summary nodes has the minimum difference to a predetermined or dynamically determined fraction of the query time period. For example, the predetermined fraction may be ⅟₅₀ and ⅟₁₀₀₀, so that the query processing level may correspond to a level at which the time period corresponding to the summary nodes is closest to equaling the predetermined fraction of the query time period.

The summary query result may take the form of a list. When an entry in the summary data structure matching the query fields is found, a new entry may be added to the list including the unique combination of quantised signal property values corresponding to that entry and corresponding summary node start and end times. When signals are added from the auxiliary database, a new entry may be added to the list including the signal values corresponding to that signal, and corresponding signal start and end times, and the count value may be assigned as 1 (one).

The method may include aggregating one or more signal properties stored in the summary query result in the same way as aggregating signal as for signal properties stored in the detailed query result. Aggregating one or more signal properties stored in the summary query result may be additionally weighted based on the count number corresponding to each entry.

According to a third aspect of the invention, there is provided apparatus configured to carry out the method according to the first and/or second aspects.

According to a fourth aspect of the invention, there is provided apparatus configured to receive a time series of radio data. The apparatus is also configured, for each of a plurality of buffer periods, at the end of a most recently elapsed buffer period, to analyse the radio data of that buffer period to detect signals. The apparatus is also configured, in response to detecting one or more signals ending within that buffer period to determine a start time and an end time of that signal, and one or more signal properties corresponding to that signal, the signal properties including at least a duration, and to store that signal to a detailed database and a summary database. The detailed database includes a plurality of levels. Each level includes one or more detailed nodes. The detailed nodes within each level sub-divide time into consecutive detailed node periods. Storing a signal to the detailed database includes storing the signal properties corresponding to that signal into the lowest level available detailed node corresponding to a detailed node period encompassing the start time and end time of that signal. The summary database includes an auxiliary database and a tree-structure of summary nodes having a plurality of levels.

The summary nodes at each level correspond to consecutive summary node periods of equal length. Each summary node stores a summary data structure which stores, for each unique combination of quantised signal property values, a count of the number of signals corresponding to the respective summary node period which have that unique combination of quantised signal property values. Storing a signal to the summary database includes, at each level of the summary database, updating, based on the signal properties, the summary data structures of one or more summary nodes having summary node periods overlapping the duration of that signal, or storing the signal properties corresponding to that signal in the auxiliary database.

The apparatus may also include one or more radios configured to receive the time series of radio data.

BRIEF DESCRIPTION OF THE DRAWINGS

Certain embodiments of the present invention will now be described, by way of example, with reference to the accompanying drawings in which.

DETAILED DESCRIPTION OF CERTAIN EMBODIMENTS

Figure 1:
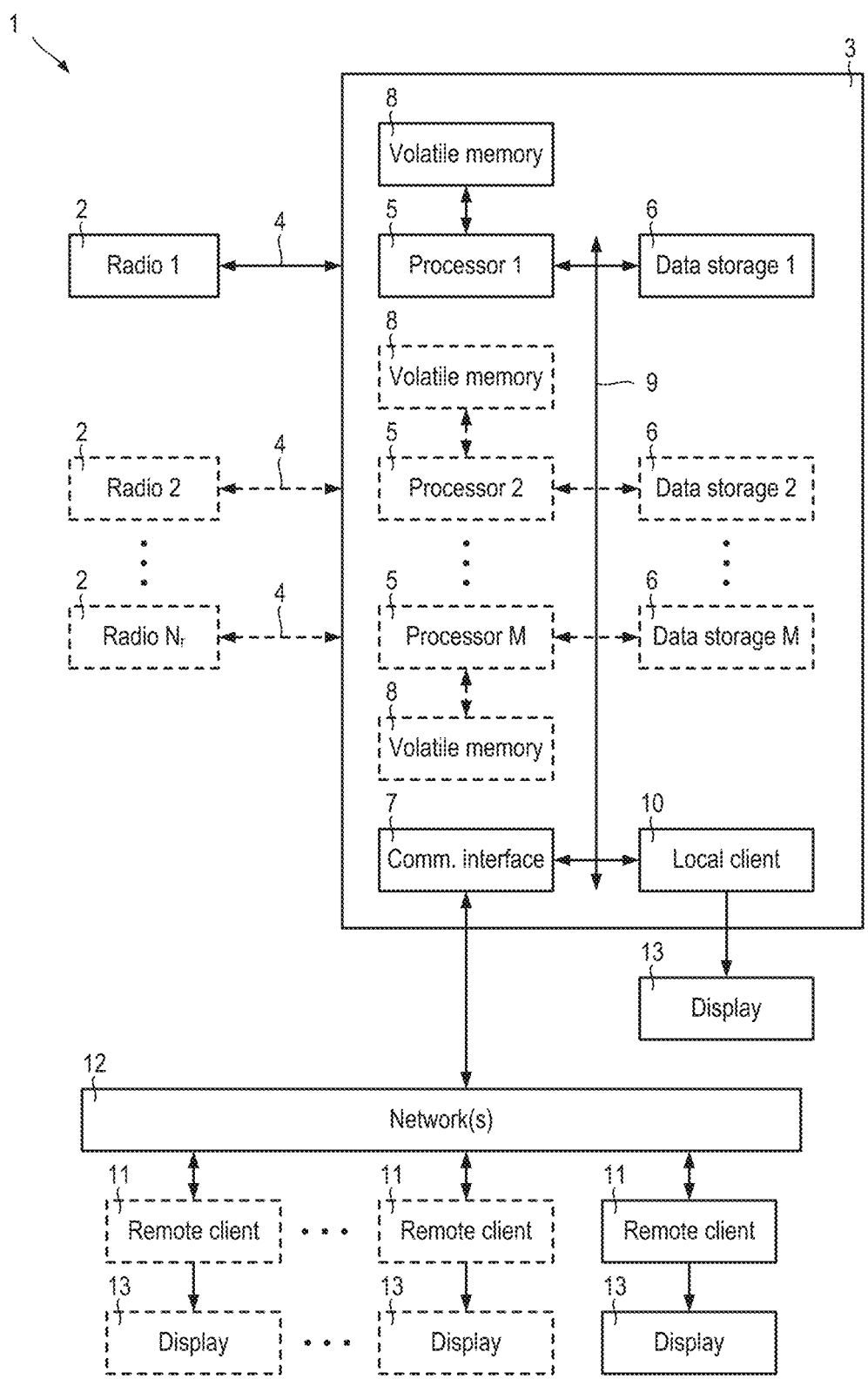
FIG. 1 illustrates a system for processing one or more time series of radio frequency data received from, or obtained using, one or more radio receivers.

In the following description, like parts are denoted by like reference numerals.

Processing a large dataset to produce indices and summary data can be time consuming. When an extended time series of data had finished collecting/recording, a user must wait for a large volume of data, typically terabytes, petabytes or even more, to be processed and indexed before they can begin analysing the data. Such processing may extend for hours or even days, depending on the volume of data. In many applications, in particular diagnostic or detection applications, it would be advantageous to be able to analyse recorded data as soon as possible, or to be able to conduct real time analysis during the data collection.

WO 2021/171018 A1 describes methods enabling indexing, aggregation and even browsing of time series of data, including radio IQ data, in real-time without interrupting reception and storage of the time series of data. The aggregation of the received data described in WO 2021/171018 A1 allows for browsing of the dataset almost immediately after finishing reception, or even during reception of the time series of data. In particular, the data may be visualised at different timescales using the pre-aggregated data. For raw data, for example radio IQ data, there are reasonably predictable ways to aggregate data, for example, total power corresponding to a given combination of a frequency range $6F$ and time interval $St$.

However, to move beyond visualisation and browsing of raw data and enable comparable functionality for derived measurements, the number of possible permutations of search parameters expands very rapidly, so that it becomes impractical to pre-generate aggregations in the manner outlined in WO 2021/171018 A1. Firstly, because generating a large number of permutations of pre-aggregated views will make it challenging or impossible to keep up with real-time acquisition and storage of a time series. Secondly, because generating a large number of permutations of pre-aggregated views will require large amounts of additional storage for views which a user may, or may not, ever wish to view.

This specification concerns methods and hardware for analysis of time series of radio data. Any hardware and/or methods suitable to provide real-time acquisition and storage of a time series of radio data may be used in combination with the methods of analysis described herein. Real-time indexing of the time series of radio data is preferable, but not essential. For example, indexing, aggregation and even browsing of the time series of radio data may be implemented as described in WO 2021/171018 A1, the entire contents of which are hereby incorporated by reference. In particular, the system shown in FIG. 5 of WO 2021/171018 A1 may be used to implement the methods described in relation to FIGS. 2 to 4 of WO 2021/171018 A1.

The present specification concerns analysing the time series of radio data as it is obtained to identify any likely signals. Once a signal is identified, one or more predetermined or user specified signal properties of that signal are determined, and the signal and corresponding signal properties are stored to a dual-database structure described hereinafter. As will be explained, the dual-database structure includes a detailed database storing full information of each signal, and a summary database which may be used to rapidly and dynamically generate aggregations for visualising the signal properties in response to a user query. The methods of the present specification enable a user to begin analysing the derived data for automatically identified signals almost immediately after acquisition, or even during acquisition without interrupting reception and storage of the time series of radio data.

Although there are conventional methods for inserting new nodes into database structures, conventional methods typically require updating previously generated nodes. This can be time consuming, especially as the tree grows larger, and may be further complicated if each node should also point to corresponding summary data (which may require re-calculation if the node is updated). As already mentioned, pre-generated of summary/aggregated data is impractical for all possible permutations of more than a couple of a signal properties.

In contrast, the methods of the present specification are optimised for live, or real time, indexing, and also includes generating a summary database which enables user queries covering large numbers of signals to be processed without the need to revert to every individual signal record. Further distinctive details of the new method of indexing and analysing a time series of radio data in real-time shall become apparent from the descriptions hereinafter.

Where this specification refers to a binary tree structure, the following terminology may be used herein. A binary tree herein is formed from a number of binary tree nodes, each of which may have between zero and two edges which connect to binary tree nodes at a lower level of the tree structure. The number of edges leaving a binary tree node may be referred to as the degree of that binary tree node. A binary tree node having a degree of zero may be referred to as a leaf (plural leaves, sometimes also referred to as "end" nodes). The highest level binary tree node in a binary tree may be referred to as a binary tree root node. The intermediate binary tree nodes connecting between a binary tree root node and the binary tree leaves descending from that binary tree root node may simply be referred to as binary tree nodes (or alternatively as binary tree "branch" nodes). Binary tree nodes and binary tree root nodes may sometimes also be referred to as "internal" nodes, in contrast to binary tree leaves. Trinary tree structures are similar and use similar terminology, and differ from binary trees in that each node may have between zero and three edges. Similarly for Quaternary, and so forth to the general case of an N-ary tree structure (having between zero and a number, N, of edges).

The lower level nodes connected by edges to a node may be referred to as the children of that node, which itself may be referred to as the parent of the connected lower level nodes.

The depth of a node or leaf may refer to the number of edges which must be traversed moving from the root node to that node or leaf. The height of a node may refer to the number of edges which must be traversed moving from the deepest leaf to that node. The height may refer to the height of the root node of a tree structure. A level of a tree structure may refer to all the nodes or leaves having the same depth or same height. All nodes and leaves which may be reached from a particular node may be referred to as descendants of that node, and that node itself may be referred to as an ancestor of the descendant nodes and/or leaves.

Structures other than tree-structures are also referred to herein, and may be described having levels/heights and nodes/leaves by analogy to tree-structures. In particular, the detailed database described hereinafter with reference to FIGS. 6A to 7.

Referring to FIG. 1, a system 1 is shown.

The system 1 includes one or more data sources in the form of radio receivers 2 in communication with an apparatus 3 via corresponding links 4. The apparatus 3 includes one or more processors 5, one or more storage devices 6 and optionally a communications interface 7. Each processor 5 has associated volatile memory 8 accessible by that processor 5. Each processor 5 preferably has a corresponding data storage device 6, although this is not necessary depending on the bit rate of processed data output by the processor 5. In other examples, more than one storage device 6 may correspond to a single processor (for example a Redundant Array of Independent Disks, or RAID, configuration). The number, M, of processors 5 is preferably equal to the number, $N_r$, of radio receivers 2, so that each processor 5 may be dedicated to processing a time series of data from a particular radio receiver 2. However, depending on the computational capacity of each processor 5 and the bit-rate from each radio receiver 2, a processor 5 may process data from two or more radio receivers 2 in some examples for which $N_r > M$.

When the apparatus 3 includes two or more processors 5, they may be integrated in a single data processing device or chip, for example sharing a common bus 9 (as illustrated in FIG. 1) and/or volatile memory 8. Alternatively, when the apparatus 3 includes two or more processors 5, each processor 5 may be provided as a separate data processing device, optionally including one or more dedicated data storage devices 6 and volatile memory 8, and the multiple data processing devices may be stacked (or racked) or otherwise interconnected to provide the apparatus 3.

The system 1 includes a client which may take the form of a local client 10 integrated with or connected to the apparatus 3, and/or one or more remote clients 11 connected to the apparatus 3 via the communications interface 7 and one or more wired or wireless networks 12. The one or more wired or wireless networks 12 may include the internet.

Each local or remote client 10, 11 is connected to a display 13, or some other suitable output device, in order to present information received from the apparatus 3 to a user. Each local or remote client 10, 11 may be configured to receive and/or generate user queries and to transmit the user queries to the apparatus 3. A user query may be manually input by a user, for example by providing input to a graphical user interface (GUI) or using an electronic form. Alternatively, a user query may be automatically generated and submitted by an analysis program (not shown), or a graphical user interface used for data browsing being executed by the local or remote client 10, 11. For example, an analysis program (not shown) may utilise an application program interface (API) for data queries to formulate and submit user queries to the apparatus 3. An analysis program (not shown) may include one or more machine learning models, for example, trained on human indexed training sets to identify particular signals or types of signals for follow-up, for example for review by a human user. In some applications, for example detecting unmanned aerial vehicles, UAVs, or "drones" approaching or encroaching on an airport perimeter, the analysis program may trigger automated follow-up using one or more cameras directed based on the radio data.

Herein, the term "user query" may be used to encompass manually entered user queries and also user queries which are automatically generated, for example by an analysis program (not shown) being executed by the local or remote client 10, 11.

Each processor 5 may be a single core processor or a multi-core processor. When two or more processors 5 are used, each processor 5 preferably does not correspond to different cores of a single processor unit/chip. Each processor 5 may take the form of one or more digital, electronic programmable central processing units (CPUs) capable of executing code read from a non-transitory medium or a memory (for example data storage device 6 and/or volatile memory 8) to perform the functions and operations taught herein. Alternatively, each processor 5 and the corresponding volatile memory 8 may be provided by a corresponding microcontroller. In other examples, the methods described hereinafter may be performed using processors 5 and volatile memories 8 implemented using any suitable digital signal processing circuit, such as a system-on-a-chip, application specific integrated circuit (ASIC) or field-programmable gate array (FPGA).

Each data storage device 6 may take the form of one of more non-transitory computer readable media such as, for example, hard disc drives (HDD) and/or solid state drives (SSD). Each data storage device 6 may take the form of a number of HDDs configured as a Redundant Array of Independent Discs (RAID), or a number of SSDs arranged in a RAID configuration.

The links 4 connecting the radio receivers 2 to the apparatus 3 may take the form of physical connections such as, for example, Ethernet connections, optical fibre links, co-axial cables and so forth. Alternatively, some or all of the links 4 may take the form of wireless links. The links 4 may include one or more networks such as, for example, mobile phone networks, the internet, local area networks, and so forth. The links 4 should be sufficient to transfer the data bit-rate output by the radio receivers 2. In applications where provision of reliable and/or sufficiently high bandwidth links 4 is not possible, processing may be devolved to data nodes (not shown) integrating a radio receiver 2 with the processing 5, memory 8 and storage 6 necessary to perform some or all of the steps of the data processing methods described herein. Data may be periodically downloaded from data nodes (not shown) by visiting each data node (not shown) and establishing a direct connection or short range wireless connection to a communication interface of that data node (not shown).

A time series of data received from each radio receiver 2 of the respective link 4 may take the form of In-phase and Quadrature (IQ) data, spectrograms generated by applying overlapped Fast Fourier Transforms (FFTs) to the IQ data, power spectrum data, or any other data suitable for representing radio signals or spectra. The apparatus 3 may control the tuning frequency of each radio receiver 2 For example, user input via a GUI executed by a local or remote client 10, ii may specify a range of frequencies for the radio receivers 2. In some implementations a lower, start frequency $f_1$ and an upper, end frequency $f_2$ may be pre-set (for example loaded from a configuration file), or dynamically user defined using the GUI executed by a local or remote client 10, ii.

The apparatus 3 may control the one or more radio receivers 2 to perform a frequency swept measurement spanning the range between the start and end frequencies $f_1$, $f_2$. A frequency sweep may be used when a radio receiver 2 has an instantaneous bandwidth $\Delta f_{IBW}$, which is less than the range $f_2-f_1$ between start and end frequencies $f_1$, $f_2$. However, when the start and end frequencies $f_1,f_2$ have a range smaller than the instantaneous bandwidth $\Delta f_{IBW}$, a frequency sweep may not be necessary.

When two or more radio receivers 2 are connected to the apparatus 3, a frequency sweep may be performed faster by staggering the central frequencies $f_c$ to which each radio receiver 2 is tuned. Alternatively, when two or more radio receivers 2 are connected to the apparatus 3, they may be tuned to have adjacent or overlapping instantaneous bandwidths $\Delta f_{IBW}$, increasing an effective instantaneous bandwidth for which a time series of radio data may be recorded. When two or more radio receivers 2 are tuned to have adjacent or overlapping instantaneous bandwidths $\Delta f_{IBW}$ in order to provide an increased effective instantaneous bandwidth, the corresponding time series of radio data may be combined (e.g. concatenated in frequency) and processed as a single time series of data (for example, at each time the data may include pairs of frequencies and corresponding signal power and/or phase).

In a further alternative, each of two or more radio receivers 2 may be individually tunable to a different central wavelength $f_c$ in order to make independent measurements. When two or more radio receivers 2 are separately tuned for independent measurements, the data from each radio receiver 2 may be processed as a separate time series of data.

Method of Analysing and Indexing a Time Series of Radio Data

Figure 2:
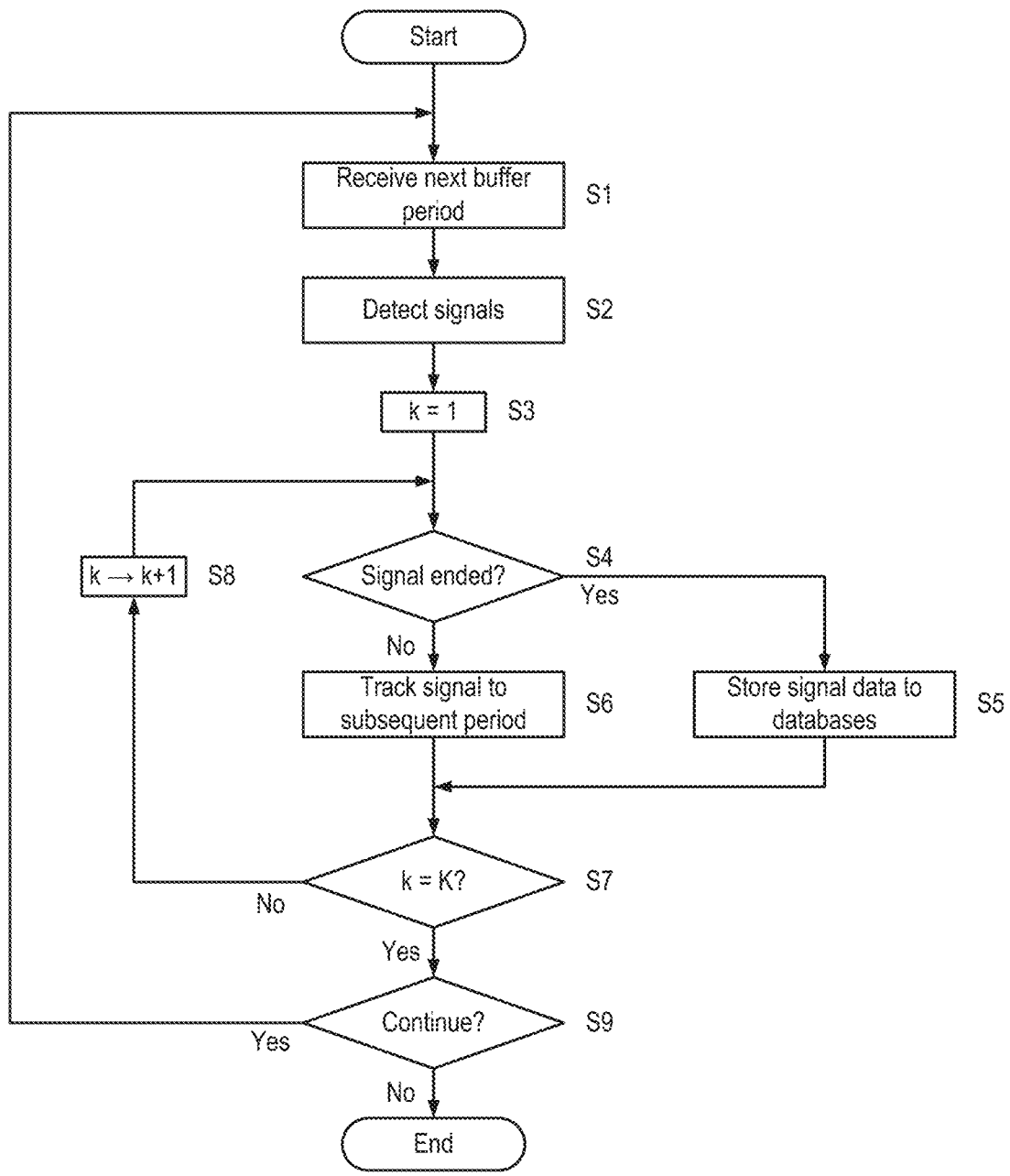
FIG. 2 shows a process flow diagram for a method of analysing and indexing a time series of radio data.

Referring also to FIG. 2, a process flow diagram is shown for a method of analysing and indexing a time series of radio data.

The method of FIG. 2, and all subsequently described methods herein, are computer implemented. For example, using the apparatus 3 shown in FIG. 1. Alternatively, methods described herein may be executed by any suitable data processing apparatus including one or more digital electronic processors communicatively coupled to random-access memory and computer readable storage, said data processing apparatus including or being communicatively coupled to one or more radio receivers in order to receive a time series of radio data.

The method illustrated in FIG. 2 does not relate to the reception, storage and optionally indexing of the radio data as received, for example the IQ data, power data and so forth. This may be carried out using any suitable method, including but not limited to the methods described in WO 2021/171018 A1, the entire contents of which are hereby incorporated by reference. For example, the system shown in FIG. 5 of WO 2021/171018 A1 may be used to implement the methods described in relation to FIGS. 2 to 4 of WO 2021/171018 A1.

Instead, the method illustrated in FIG. 2 concerns analysing the time series of radio data to detect signals, determining one or more signal properties of detected signals, and storing and indexing the signals and signal properties ready for swift browsing and/or querying.

A buffer of the time series of radio data is received (alternatively "filled") (step S1). Let E(t) denote the radio data of the time series sampled at time t. The sample E(t) may take the form of IQ data (2D vector) from one or more radio receivers 2. Alternatively, the sample E(t) may take the form of a list comprising frequencies f spanning between the start $f_1$ and end $f_2$ frequencies, each frequency having corresponding values of power and phase.

The method explained hereinafter may be readily adapted to any specific format or content of the samples E(t). Samples E(t) are typically obtained at regular sampling intervals $\delta t$, relative to a start time $t_0$ (for example the beginning of recording the time series of radio data), let $E(t_0+r \cdot \delta t)=E_r$ for positive, integer r. The received buffer may have a size Rb so that the buffer received (step S1) may be denoted as BuffR=$\{E_{r-Rb+1}, E_{r-Rb+2}, \ldots, E_{r-1}, E_r\}$. A second buffer of the same length Rb may be filled with the time series of radio data whilst the received buffer period BuffR is processed. Depending on the processing speed available, the data rate and similar considerations, two, three or even more buffers may be maintained.

Following the end of each consecutive buffer period $Rb \cdot \delta t$, the radio data BuffR=$\{E_{r-Rb+1}, E_{r-Rb+2}, \ldots, E_{r-1}, E_r\}$ stored for the most recently elapsed buffer period $Rb \cdot \delta t$ is analysed to detect any signal which may be present (step S2). Any suitable method for automated signal detection in radio data may be used, for example including, but not limited to:
  Thresholding based on signal power (in time and/or frequency space);
  Correlation analysis to compare the radio data against one or more known signal types;
  Clustering analysis;
  Expert systems; and/or
  Application of a machine learning algorithm trained using signals indexed by a human or any of the previously mentioned methods.

Figure 3A:
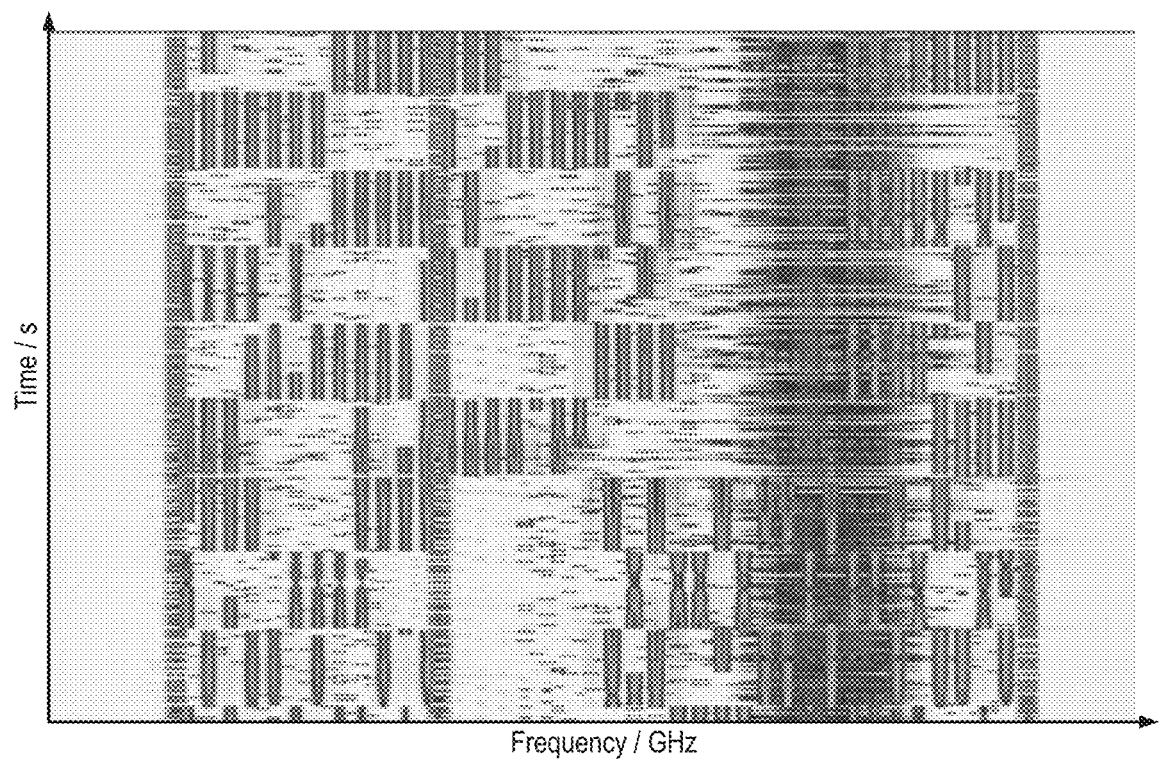
FIG. 3A shows a 2D histogram (or "heat map") of power against frequency and time.
Figure 3B:
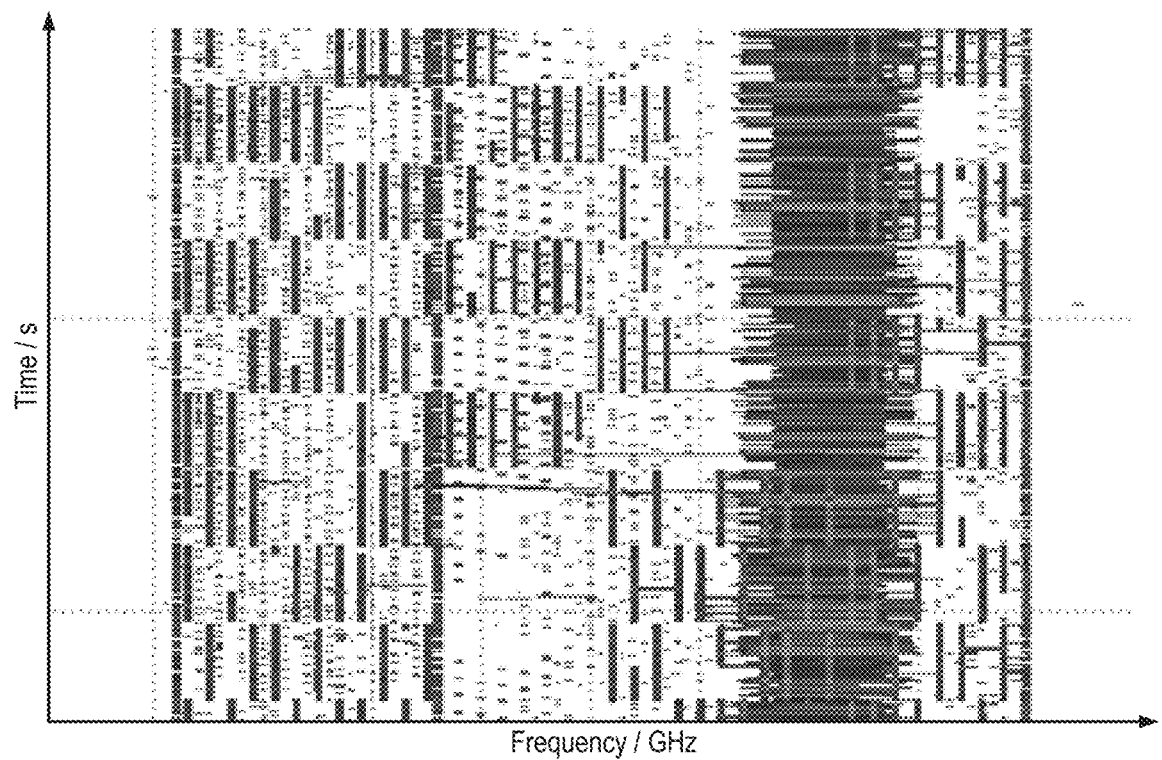
FIG. 3B is the same as FIG. 3A, with power replaced by numbers if signal detections.

Referring also to FIGS. 3A and 3B, a comparison of received radio data (FIG. 3A) and corresponding identified signals (FIG. 3B) is shown.

FIG. 3A presents a 2-dimensional histogram (or "heatmap") having frequency along the horizontal x-axis and time along the vertical y-axis, with the shading (z-axis) corresponding to total power in a given frequency and time bin. Lighter shades represent less power and darker shades indicate greater power.

FIG. 3B presents a 2-dimensional histogram (heat-map) corresponding to FIG. 3A, except that the shading corresponds to the number of signal detections in a given frequency and time bin. Lighter shades represent fewer detections and darker shades indicate more detections.

In general, there may be more than one signal concurrently active—in particular when the time series of radio data $E_r$ spans a range of frequencies $f_2-f_1$ (as is typical). Let the total number of signals active detected during a buffer BuffR be denoted by K (a positive integer), then starting from a first signal (ordered from earliest to latest signal end time) (step S3), the $k^{th}$ of K signals is checked to determine whether it ends during the most recent buffer BuffR (step S4).

If the $k^{th}$ of K signals has ended (step S4 Yes), then the signal data for that signal is stored to a detailed database DD (FIG. 6B) and summary database SD (FIG. 9) (step S5).

This includes determining a start time $t_{start}$ and an end time $t_{end}$ of that signal, as well as determining one or more signal properties including at least a duration $d=t_{end}-t_{start}$. Other signal properties may include (without being limited to), one or more of:

A minimum frequency $f_{min}$ (sometimes also referred to as a "start" frequency);
A maximum frequency $f_{max}$ (sometimes also referred to as an "end" frequency);
A signal bandwidth $\delta f=f_{max}-f_{min}$;
A centre frequency $f_c$; and/or
An integrated signal power W.

Figure 9:
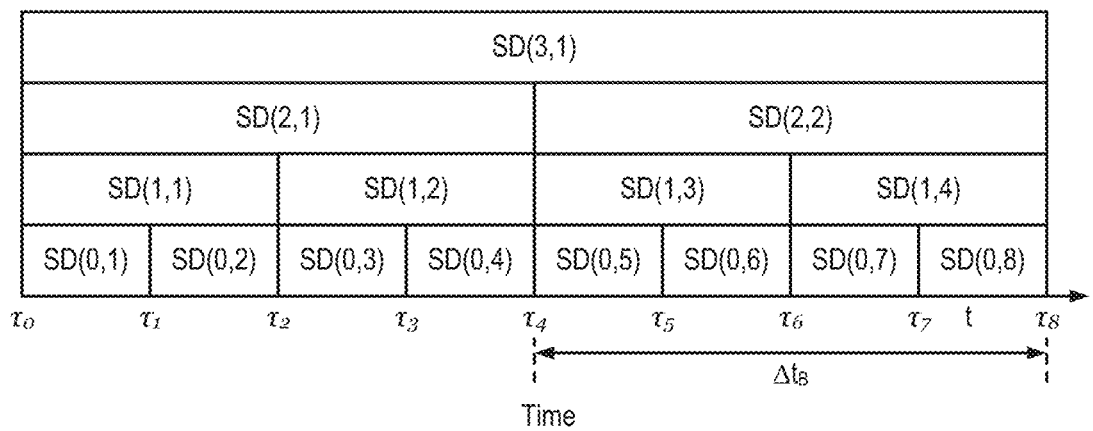
FIG. 9 schematically illustrates the structure of a tree structure of a summary database.

The start time $t_{start}$, end time $t_{end}$ and the one or more signal properties of the signal are saved to the detailed database DD (FIG. 6B) and summary database SD (FIG. 9).

The detailed database DD (FIG. 6B) includes a number $0 \leq n \leq N-1$ levels, with N an integer $\geq 1$ and n an index of level within the detailed database DD. Each level n includes a number $M_n \geq 1$ of detailed nodes $DD(n,m_n)$ (FIG. 6C) with $m_n$ an integer index $1 \leq m \leq M_n$. The detailed node $DD(n,m_n)$ within each level n sub-divides time t into consecutive detailed node periods $\Delta t_D(n,m_n)$. Each detailed node $DD(n,m_n)$ has a corresponding node start time $tD_{start}(n,m_n)$ and end time $tD_{end}(n,m_n)$ such that $\Delta t_D(n,m_n)=tD_{end}(n,m_n)-tD_{start}(n,m_n)$.

Figure 7:
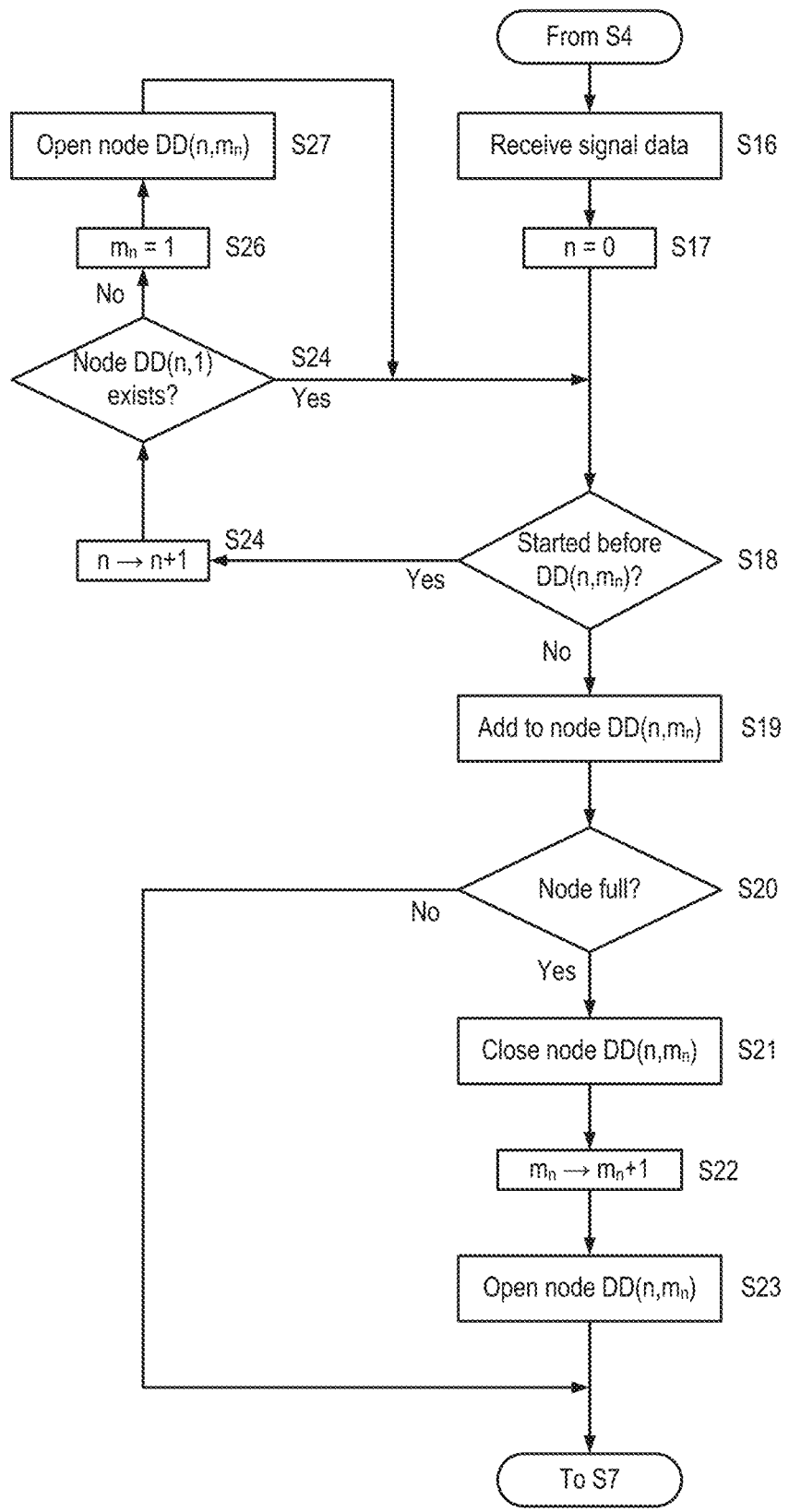
FIG. 7 shows a process flow diagram for a method of forming the detailed database.

Storing a signal to the detailed database DD includes storing the start time $t_{start}$, end time $t_{end}$ and the one or more signal properties into the lowest level n available detailed node $DD(n,m_n)$ corresponding to a detailed node time period $\Delta t_D(n,m_n)$ encompassing the start time $t_{start}$ and end time tend of that signal, i.e. $tD_{start}(n,m_n) \leq t_{start} \leq tD_{end}(n,m_n)$ and $tD_{start}(n,m_n) \leq t_{end} \leq tD_{end}(n,m_n)$. One suitable example of a method for storing signal data to the detailed database DD (and in the process building the detailed database DD) is shown in FIG. 7 and explained hereinafter.

The summary database SD includes two parts, an auxiliary database AD (FIG. 13C) and a tree-structure of summary nodes $SD(n,m_n)$ (FIG. 9) having a plurality of levels n, $0 \leq n \leq N-1$. Note that the number N of levels n need not be identical between the detailed DD and summary SD databases, however the same index variables are used herein because which database is referenced shall be clear from the context. The summary nodes $SD(n,m_n)$ at each level correspond to consecutive summary node periods $\Delta t_S(n,m_n)$ of equal length. Each summary node $SD(n,m_n)$ has a corresponding node start time $tS_{start}(n,m_n)$ and end time $tS_{end}(n,m_n)$ such that $\Delta t_S(n,m_n)=tS_{end}(n,m_n)-tS_{start}(n,m_n)$. Each summary node stores a summary data structure, denoted SUM herein. The summary data structure SUM stores, for each unique combination of quantised (or "binned") signal property values, a count of the number of signals corresponding to the respective summary node period which have that unique combination of quantised signal property values.

Figure 10:
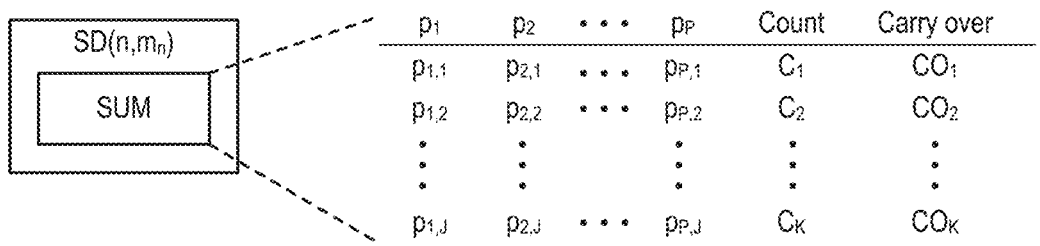
FIG. 10 schematically illustrates the structure of a node of the tree structure shown in FIG. 9.

For example, let $p_1, p_2, \ldots, p_P$ denote a number P of signal property values measured for each signal. One approach to the summary data structure SUM would be to use a P-dimensional array (or alternatively a P-dimensional histogram), having corresponding counts of signal numbers as entries. This would typically be very sparse and memory intensive, so preferably each time a new unique set of properties $\{p_1, p_2, \ldots, p_P\}$ is detected (up to the width of quantisation/binning), a new row may be added to a list specifying the set of properties $\{p_1, p_2, \ldots, p_P\}$ and an associated count value C (as shown in FIG. 10). More preferably, the summary data structure SUM is stored as a hashmap. The signal start $t_{start}$ and end $t_{end}$ times are not stored in the summary data structure SUM, since this would in practice prevent the intended aggregation of signal property data.

Storing a signal to the summary database SD includes, at each level of the summary database, either:

updating, based on the signal properties $\{p_1, p_2, \ldots, p_P\}$, the summary data structures SUM of one or more summary nodes $SD(n,m_n)$ having summary node periods $\Delta t_S(n,m_n)$ overlapping the duration $d=t_{end}-t_{start}$ of that signal; or
storing the signal data (i.e tstart, tend, $\{p_1, p_2, \ldots, p_P\}$) corresponding to that signal in the auxiliary database AD.

Figure 11:
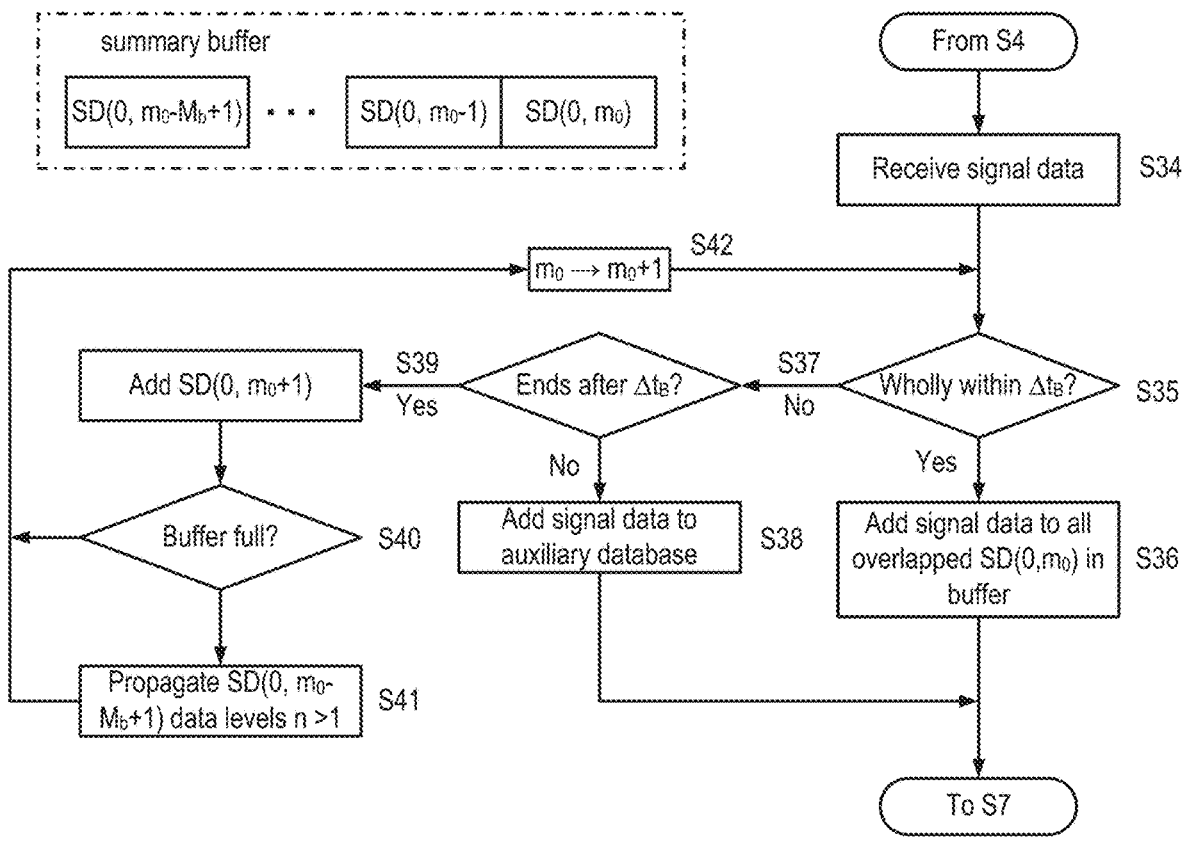
FIG. 11 shows a process flow diagram for a first exemplary method of building a summary database.
Figure 12:
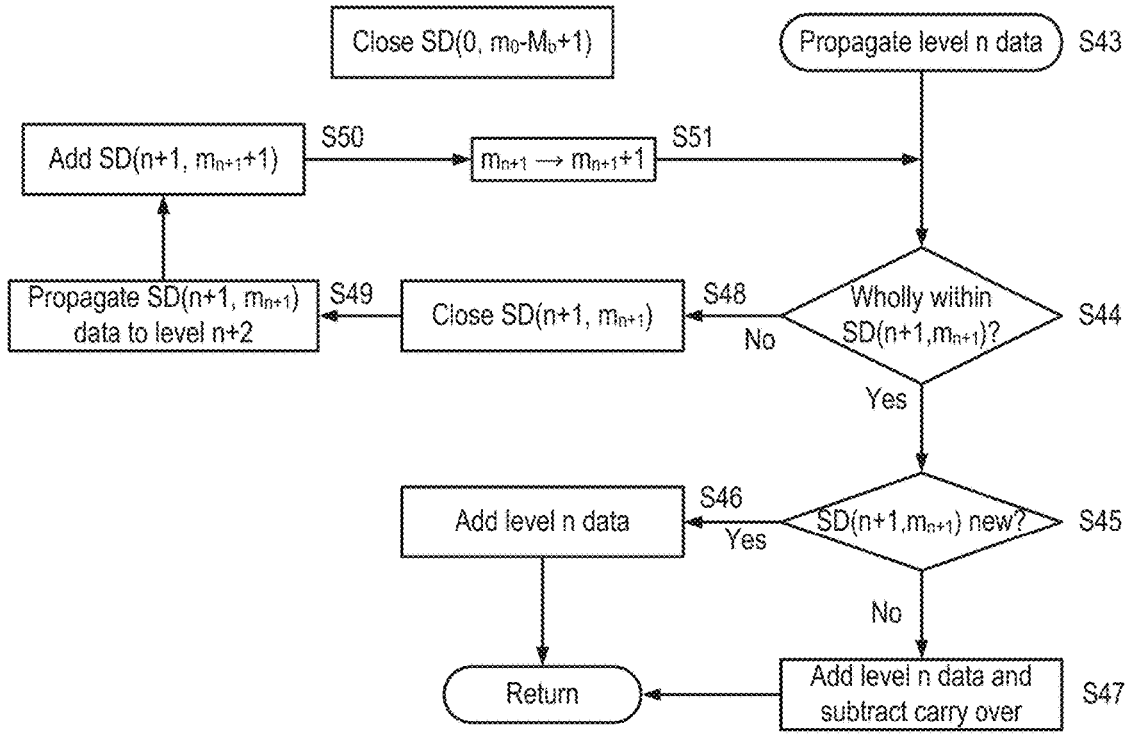
FIG. 12 shows a process flow diagram for a method of propagating data to higher levels within a tree structure as part of the method of FIG. 11.

Examples of methods for storing signal data to the summary database SD (and in the process building the summary database SD) are shown in FIGS. 11 and 12, in FIGS. 15 and 16, and in FIGS. 20 and 21, and each is explained in further detail hereinafter.

Returning to refer in particular to FIG. 2, if the $k^{th}$ of K signals has not ended (step S4|No), then that signal is tracked to the next buffer period (step S6). The tracking of signals may be based on, for example, maintaining a frequency sorted list of active signals. This may include determining a start time $t_{start}$ (or propagating one determined from a previous buffer period), and also determining one or more properties of the partially captured signals, for example a central frequency $f_c$ or a bandwidth $\delta f$, in order to allow matching a tracked signal between successive buffer periods. Additionally or alternatively, each buffer BuffR may be configured to have a number of samples at the start which correspond to (or overlap) the final samples of the preceding buffer BuffR, to allow matching up signals between periods using correlation analysis.

If there are further detected signals to consider (step S7|Yes), the next signal detection is processed (steps S8 and S4). Otherwise, provided the collection of the time series of radio data continues (step S9|Yes), the next buffer BuffR is received (step S1) and the processing repeated.

Figure 4:
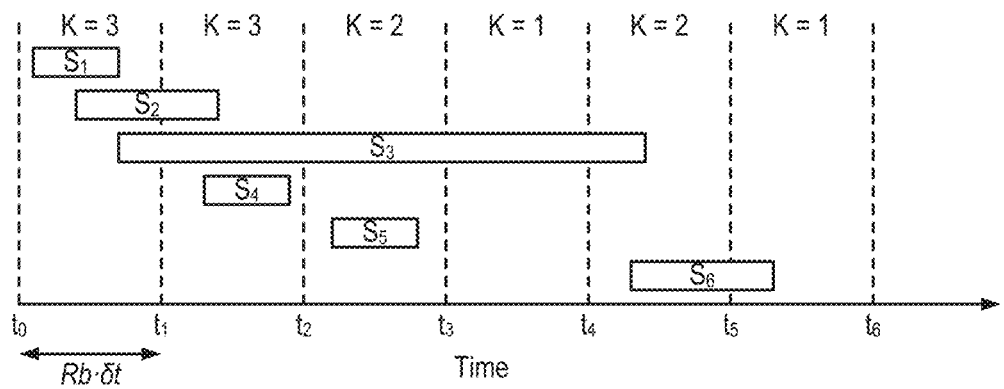
FIG. 4 schematically illustrates an example of signal detections spread across a number of buffer time periods of the method shown in FIG. 2.

Referring also to FIG. 4, an example of tracking and processing signal detections across a number of buffer time periods $Rb \cdot \delta t$ is shown.

In the first buffer period $t_0 \leq t < t_1$, three signals $S_1$, $S_2$ and $S_4$ are detected (step S2), so that all of them start in the period, K=3. A first signal $S_1$ also ends (step S4|Yes) during the corresponding buffer BuffR and is stored to the databases DD, SD (step S5). However, the second $S_2$ and third $S_3$ signals (presumed to be distinguishable, for example by frequency) do not end (step S4|No) and are instead tracked (step S6) to the next buffer period $t_1 \leq t < t_2$. It may be concluded that a detected signal has ended by, for example, looking for a period of baseline/background power in the corresponding frequency range.

In the second buffer period $t_1 \leq t < t_2$, there are again a total of K=3 signal detections. The second signal $S_2$ ends and is stored, as does the new, fourth signal $S_4$, however the third signal $S_3$ continues and is again tracked to the next buffer period.

In the third buffer period $t_2 \leq t < t_3$, there are a total of K=2 signal detections. A new fifth signal $S_5$ starts but also ends, and is processed. The third signal $S_3$ is once again tracked to the following, fourth buffer period $t_3 \leq t < t_4$. No signals end in the fourth buffer period $t_3 \leq t < t_4$, and the third signal $S_3$ continues to be tracked.

In the fifth buffer period $t_4 \leq t < t_5$, the third signal $S_3$ ends, and is processed, whilst a sixth signal $S_6$ is detected but does not finish. The sixth signal $S_6$ is tracked into the sixth buffer period $t_5 \leq t < t_6$, during which it finishes and is processed.

In the examples described herein, the summary database SD includes a binary tree index. However, this is not essential, and in variations of the methods described herein the summary database may use a trinary tree index, a quaternary tree index, and so forth.

Expressed alternatively, in the general case the summary database SD includes an N-ary tree index with index n≥2.

The auxiliary database AD may have the same structure as the detailed database DD. Further examples are explained in relation to methods illustrated in FIGS. 11 and 12, in FIGS. 15 and 16, and in FIGS. 20 and 21.

The leaf node period $\Delta t_S(o, m_n)$ corresponding to each summary node $SD(o, m_n)$ at the leaf (lowest) level (n=0) may also be referred to herein as a "base time period".

The quantisation of signal property values $p_1, P_2, \ldots, p_P$ for the purposes of the summary data structure SUM may alternatively be described as binning. The quantisation (or binning) need not be the same at each level n of the summary database SD. In some implementations, the quantisation (or binning) may become coarser (larger bins) as the level n of the summary database SD increases. As an example, if frequency is binned into bandwidths $\delta f_{bin}$ (for example a minimum resolution determined by the sampling interval $\delta t$ in the usual way) at the lowest level n=0, then at a higher level n>0, the frequency binning may switch to an integer multiple of $\delta f_{bin}$.

Although there is no reason why the methods described herein could not be applied to index and analyse signal detections obtained from an already collected time series of radio data $E_r$, the advantages of the presently described methods are most apparent when the time series of radio data $E_r$ is received and stored in real time. The methods described herein enable that detection of signals and storage of detected signals to the detailed database DD and summary database SD can occur at the end of each buffer period $R_b \cdot \delta t$ without interrupting the reception and storage of the time series of radio data $E_r$. In particular, this is because the detailed database DD and summary database SD may be built up in real time. This is possible because detailed databases DD and summary databases SD described herein are built up based on the most recently received data $E_r$, and require no, or only minimal, changes to previously generated nodes of the respective databases SD, DD. In this way, indexing of the received time series of radio data $E_r$ can keep up with the reception of the time series of radio data $E_r$, allowing near immediate browsing and analysis once collection is completed. For example, the dataset may be browsed and/or searched at different timebase resolutions, and for any combination of the measured signal properties $p_1, p_2, \ldots, p_P$, without the need to return to search and analyse the individual signal detections each time the parameters of a visualisation are changed.

Additionally, in some examples the already generated sections of the detailed database DD and the summary database SD may be used to implement browsing, querying and analysis of data during the reception of the time series of radio data $E_r$, without interruption. In this way an operator monitoring a radio spectrum in a region/area may obtain real-time insights into what is occurring, without interrupting recording of the data and potentially missing detections.

In some examples, each summary node $SD(n, m_n)$ and each detailed node $DD(n, m_n)$ is read only once the current time t is after the respective node end period $tS_{end}(n, m_n)$, $tD_{end}(n, m_n)$.

This need not be explicitly controlled, it is more that the presently described methods focus on the leading edge of time, and do not require doubling back to modify earlier (or "closed") nodes $SD(n, m_n)$, $DD(n, m_n)$ of the databases.

Method of Querying the Detailed Database and Summary Database

Figure 5:
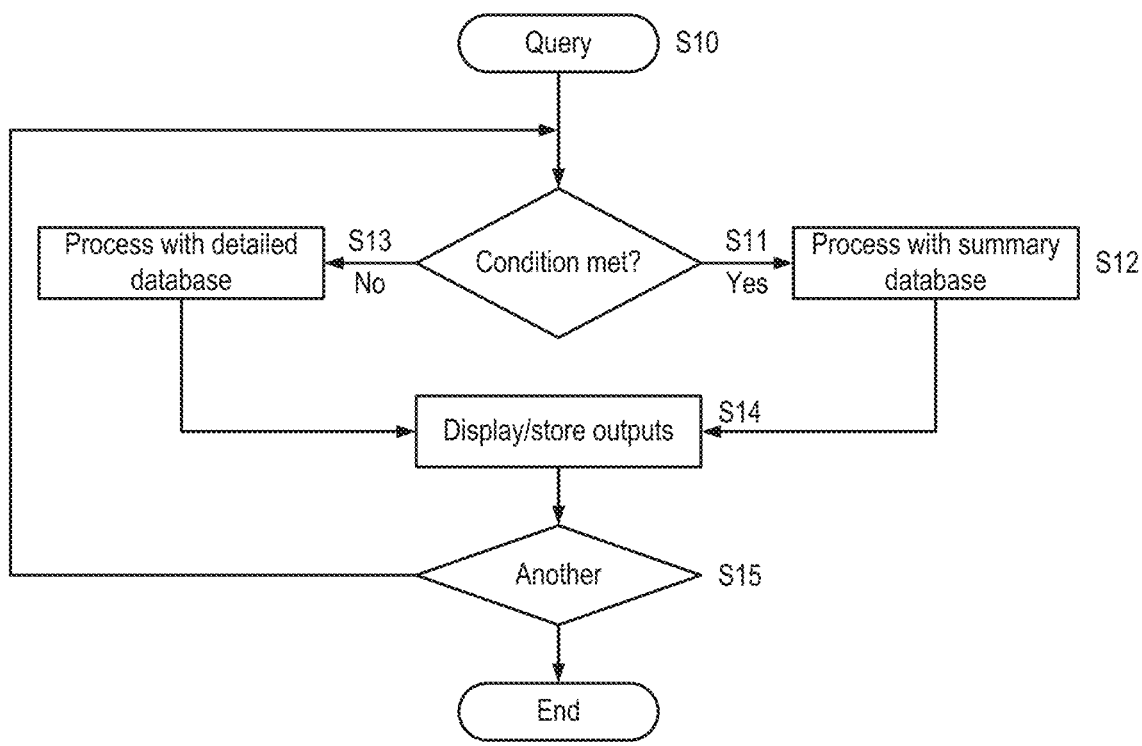
FIG. 5 shows a process flow diagram for a method of querying a detailed database and a summary database generated using the method shown in FIG. 2.

Referring also to FIG. 5, a process flow diagram is shown for a method of querying the detailed database and summary database generated using the methods of the present specification (for example, as shown in FIG. 2).

A query is received or generated (step S10). As explained hereinbefore a query may be user generated or automatically generated. In an example of a user generated query, a user may wish to generate a 2D histogram plotting, for example, peak signal power against signal duration, for signals occurring within a given time period and frequency band. In another example, a user may use controls to scroll through and/or change a timebase displayed in a GUI for visualising the dataset, and the query may be formulated automatically to update the visualising based on the users input. In other examples, a query may be automatically generated by an analysis program as described hereinbefore.

A query used for explanations herein is made up of query fields including (but not limited to):

a query start time $tQ_{start}$;
a query end time $tQ_{end}$; and
one or more ranges $\Delta p_1, \Delta p_2, \ldots, \Delta p_P$ of the signal properties $p_1, p_2, \ldots, p_P$.

The ranges $\Delta p_1, \Delta p_2, \ldots, \Delta p_P$ of the signal properties $p_1, p_2, \ldots, p_P$ do not all need to be used for searching, i.e. only a subset of signal properties $p_1, p_2, \ldots, p_P$ may be searched (equivalently, some of ranges $\Delta p_1, \Delta p_2, \ldots, \Delta p_P$ may be set to span the entire dataset). The difference between the query start time $tQ_{start}$ and the query end time $tQ_{end}$ is a query time period $\Delta t_Q = tQ_{end} - tQ_{start}$.

In response to meeting a condition based on the query fields (step S11|Yes), the query is processed using the summary database SD (step S12), and otherwise (step S11|No), the query is processed using the detailed database DD (step S13). An example of processing a query using the detailed database DD is described hereinafter in relation to FIG. 8. Examples of processing a query using the summary database SD are described hereinafter in relation to FIGS. 14 and 18.

The purpose of the condition is to gauge the likely number of signals which may match the query, at least to about the right order of magnitude. Queries likely to return a number of results which is manageable to process in reasonable time using the individual signal detections (i.e. without undue lag from a user's perspective) are processed using the detailed database DD. In practice, number of results which may be manageably processed depends on the computing resources available, and may vary between about $10^5$ and $10^7$. If the likely number of results will be sufficiently large to potentially cause lag/slowdown, then the summary database SD is used to process the query. This is enabled because queries likely to return hundreds or thousands, if not millions or more signal detections, will in any event require aggregation before they can be meaningfully visualised. Therefore, such queries may be resolved using the summary data structures SUM of one or more summary nodes SD(n,$m_n$) without loss of accuracy.

One example of a suitable condition is the query time period $\Delta t_Q$. The longer the query time period $\Delta t_Q$, the larger the number of individual signal detections within the bounds of the query is likely to be. A query period threshold $\Delta t_{thresh}$ may be chosen, and the condition may be applied so that for $\Delta t_Q \leq \Delta t_{thresh}$ the detailed database DD is used (step S13), whilst for $\Delta t_Q > \Delta t_{thresh}$ the summary database SD is used instead. The query period threshold $\Delta t_{thresh}$ may be predetermined or may be dynamically determined, for example, based on the processing power of hardware executing the method. In other examples, the query period threshold $\Delta t_{thresh}$ may be user specified.

Different conditions may be applied based on the query fields specified. For example, if a query is specified spanning the entire time period of the dataset but looking for signals in a queried frequency band $fQ_1$ to $fQ_2$, the total number of signals in that frequency band $fQ_1$ to $fQ_2$ may be estimated by adding up the counts of the summary data structure SUM for the root summary node SD(N−1,1) which overlap the queried frequency band $fQ_1$ to $fQ_2$. If that number exceeds a threshold, the summary database SD is used (step S12), whereas if that number is less than or equal to the threshold, the detailed database DD may be used.

In general the goal is to use the detailed database DD up until doing so would be too inefficient in time. This may correspond to a noticeable lag for a user generating the queries whilst browsing the signal detections from the time series of radio data $E_r$. For example, a user may begin to perceive a lag if the time for processing a new query and plotting a visualisation (for example due to scrolling or zooming in a GUI viewing the signal data) started to exceed about 80 ms. The factors which determine how much time the querying of the detailed database will take are dominated by the number of results that will be found by the query, in conjunction with how fast the hardware system is in general (combination of storage read speed and computing processing power). The conditions described hereinbefore, and similar conditions, represent estimating the total number of results which will require processing based on sensible guesses (time threshold $\Delta t_{thresh}$) and root/high level processing of the summary database SD. This represents a good balance between efficiency and detail.

In other examples, the condition (step S11) may be based on a lighter weight tertiary data structure, calculated based on the summary data structures, and configured to allow evaluating an indication or upper bound on the number of results a query may produce, or any other function for estimating the number of detections the query will produce.

The querying method shown in FIG. 5 may be executed after the reception and recording of the time series of radio data $E_r$ has finished. However, the query method and the structures of the detailed database DB and summary database permit querying of the partially completed databases DD, SD during reception and processing of the time series of radio data $E_r$.

Method of Storage to the Detailed Database

Figure 6A:
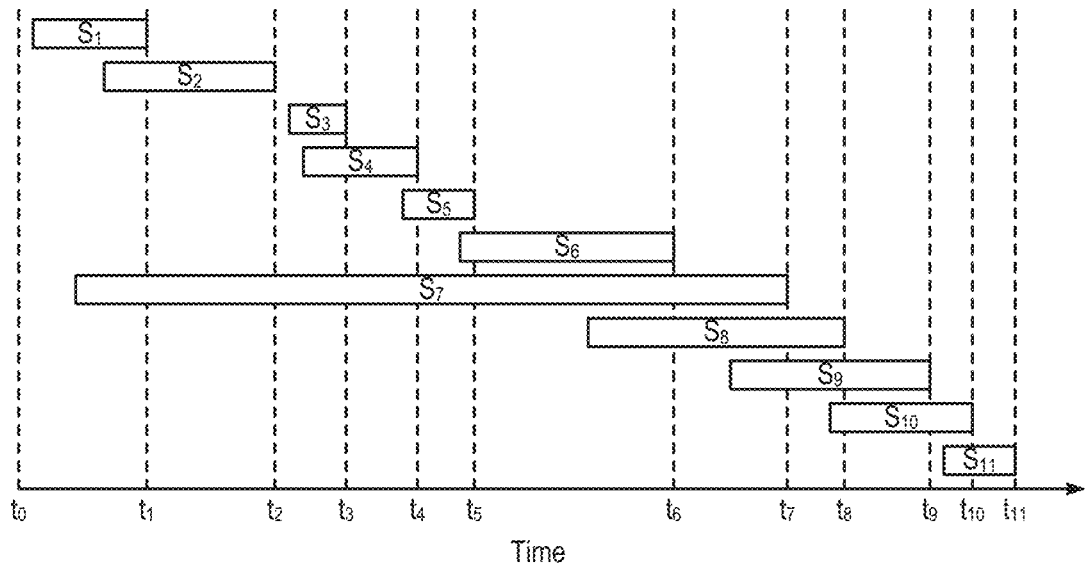
FIG. 6A schematically illustrates start and end times for a set of signals.

Referring also to FIGS. 6A to 7, an exemplary method of building the detailed database DD is shown, and illustrated in relation to a worked example.

Figure 6B:
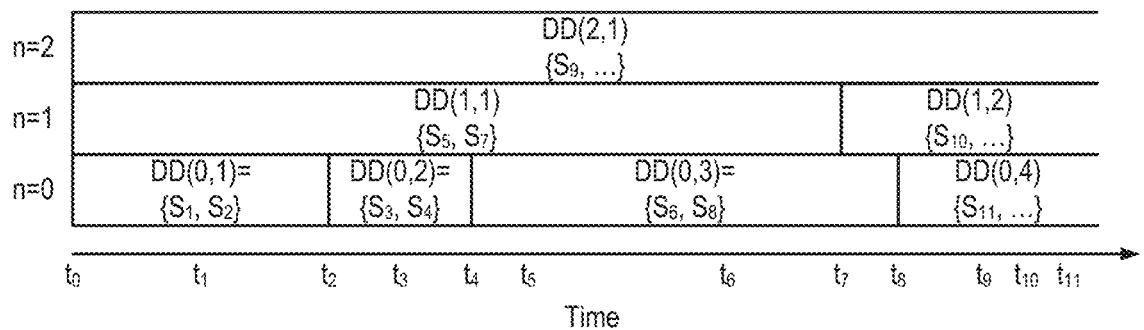
FIG. 6B schematically illustrates the contents of a detailed database formed by applying the method of FIG. 7 to the signals shown in FIG. 6A, and FIG. 6C schematically illustrates the structure of a node of the detailed database shown in FIG. 6B.
Figure 6C:
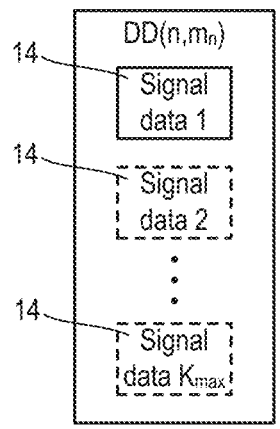

FIG. 6A schematically illustrates a set of signals in terms of start $t_{start}$ and end $t_{end}$ times. FIG. 6B schematically illustrates the contents of a detailed database formed by applying the method of FIG. 7 to the example shown in FIG. 6A. FIG. 6C schematically illustrates the structure of a single detailed node DD(n,$m_n$). FIG. 7 shows a process flow diagram of a method of forming the detailed database.

Referring in particular to FIG. 6C, in this example each detailed node DD(n, $m_n$) stores up to a threshold number $K_{max}$ of signals. Each signal is stored as signal data 14 which includes at least the signal start time $t_{start}$, the signal end time $t_{end}$, and the values of the one or more signal properties $p_1$, $p_2$, . . . , $p_P$. The threshold number $K_{max}$ of signals which each detailed node DD(n, $m_n$) can store may be a function of level n, i.e. $K_{max}$(n), and may be predetermined or set by a user prior to starting to receive and process the time series of radio data $E_r$.

Each level of the detailed database DD may include one active detailed node DD(n,$m_n$) having only a node start time $t_{start}$, and any number of closed detailed nodes DD(n,$m_n$), each having a node start time $t_{start}$ and a node end time $t_{end}$ defining the corresponding detailed node period $\Delta t_D$(n,$m_n$). For example, referring in particular to FIGS. 6A and 6B, at the end of the period shown Gust after $t_{11}$), the detailed database DD includes:

At level n=0, DD(0, 4) is the active detailed node whilst DD(0, 1), DD(0, 2) and DD(0, 3) are closed detailed nodes;

At level n=1, DD(1, 2) is the active detailed node whilst DD(1, 1) is a closed detailed node; and At level n=2, DD(2,1) is the active detailed node, and there are not yet any closed detailed nodes.

The detailed database DD shown in FIG. 6B is not a tree structure—the detailed nodes DD(n,$m_n$) at level n=1 do not point to the detailed nodes DD(n,$m_n$) at level n=0, and are not pointed to by the detailed nodes DD(n,$m_n$) at level n=2. Consequently there is no requirement for the detailed node start $tD_{start}$(n,$m_n$) and end $tD_{end}$(n,$m_n$) times, or the corresponding detailed node periods $\Delta t_D$(n,$m_n$), of one level n to have any relationship to those of the adjacent levels n±1.

Referring in particular to FIG. 7, the method of building the detailed database follows detection of a signal (step S2) and determination of the signal data 14 (step S4) including the at least the signal start time $t_{start}$, the signal end time $t_{end}$, and the values of the one or more signal properties $p_1$, $p_2$, . . . , $p_P$.

The signal data 14 is received (step S16). For example, at time t, in FIG. 6A, signal data 14 corresponding to signal $S_1$ is received, or at time $t_8$, signal data 14 corresponding to signal $S_8$ is received, and so forth.

Starting from the lowest level (step S17) of the detailed database DD, it is tested whether the start time $t_{start}$ of the signal is before the node start time $tD_{start}$(n,$m_n$) of the current active detailed node DD(n,$m_n$) at the searched level n (step S18). The detailed database is originally initialised with a single node D(0,1), which is active with a node start time $tD_{start}$(0,1) equal to the start time $t_o$ of the time series.

If no (step S18|Yes), i.e. if the signal start time $t_{start}$ is equal to or after the node start time $tD_{start}$(n,$m_n$), the signal data 14 of the signal are stored to the active node DD(n,$m_n$) (step S19). Optionally, the section of the time series data $E_r$ corresponding to the signal may also be included in the signal data 14 (for example IQ data). Alternatively, the signal data 14 may optionally include a pointer to the start of the signal in the time series data $E_r$.

After saving signal data 14 to a detailed node DD(n,$m_n$), it is tested whether that node DD(n,$m_n$) is now full, i.e. if the numbers of signal data 14 stored equals the threshold $K_{max}$(step S20). If the node is not full (step S20|No), then we proceed (step S7) to the next signal or buffer BuffR as appropriate. However, if the node is full (step S20|Yes), then the current node $DD(n,m_n)$ is closed by assigning a detailed node end time $tD_{end}(n,m_n)$ equal to the signal end time $t_{end}$ (step S21), incrementing the index $m_n$ at the searched level to $m_n+1$ (step S22), and opening a new active node $DD(n, m_n)$ by assigning the detailed node start time $tD_{start}(n,m_n)$ equal to the signal end time $t_{end}$.

Returning to step S18, if the start time $t_{start}$ of the signal is before the node start time $tD_{start}(n,m_n)$ of the current active detailed node $DD(n,m_n)$ at the searched level n (step S18|Yes), then the searched level is incremented to n+1 (step S24). If the first node $DD(n,1)$ at the new searched level exists (step S24|Yes), the test (step S18) is repeated. If the first node $DD(n,1)$ at the new searched level does not yet exist (step S24|No), the index $m_n$ is initialised $m_n=1$ (step S26) and the first node $DD(n,1)$ at the new searched level n is opened as an active node, with the node start time $tD_{start}(n,m_n)$ set equal to the start time to of the time series of radio data $E_r$ (step S27).

The method of FIG. 7 may be better understood by reference to the example shown in FIGS. 6A and 6B, in which the threshold storage capacity for all levels of detailed nodes $DD(n,m_n)$ is set to $K_{max}=2$ signal data per node.

At the end of signal $S_1$ at time $t_1$, the corresponding signal data 14 is stored to active detailed node $DD(0,1)$ having start time $tD_{start}(n,m_n)=t_0$ (step S18 evaluates to 'no' for n=0, followed by steps S19 and S20|No). At the end of signal $S_2$ at time $t_2$, the corresponding signal data 14 is again stored to active detailed node $DD(0,1)$. However this time the node if full (step S20|yes), so the detailed node $DD(0,1)$ is closed with node end time $tD_{end}(0,1)=t_2$ (step S21), and the next detailed node $DD(0,2)$ is opened with node start time $tD_{start}(0,2)=t_2$.

In similar fashion, signal data 14 corresponding to signals $S_3$ and $S_4$ are stored to detailed node $DD(0,2)$, which is then closed and a new detailed node $DD(0,3)$ is opened with node start time $tD_{start}(0,3)=t_4$. When signal $S_5$ ends at $t_5$, the start time $t_{start}$ is before $t_4$, meaning that signal $S_5$ cannot be stored to level n=0 (step S18 Yes), and the first detailed node $DD(1,1)$ is opened at level n=1 (steps S24 through S27) so that signal data 14 of signal $S_5$ may be stored to it.

Continuing though FIG. 6A, signal $S_6$ can be stored to $DD(0,3)$. Signal $S_7$ is stored to and completes $DD(1,1)$, and a new active detailed node $DD(1,2)$ is opened on level n=1. Signal $S_8$ is stored to and completes $DD(0, 3)$, and a new detailed node $DD(0, 4)$ is made active. Signal $S_9$ cannot be stored to either of the active nodes $DD(0, 4)$ or $DD(1, 2)$, so it is necessary to open a first, active node $DD(2, 1)$ at level n=2 to store the corresponding signal data 14. Signal $S_{10}$ cannot be stored to active node $DD(0, 4)$, but can be stored on the level above n=1 in $DD(1, 2)$. Finally for the signals shown in FIG. 6A, signal Su is stored into the level n=0 active node $DD(0,4)$, which still has capacity for another set of signal data 14.

The method shown in FIG. 7 uses specific tests and orders of operations. However, any other suitable method may be used instead. A suitable method will include searching successively increasing levels of the detailed database DD until an active detailed node $DD(n,m_n)$ at the searched level n has a node start time $tD_{start}(n,m_n)$ before the start time $t_{start}$ of the signal, and in response storing signal data 14 corresponding to that signal to the active detailed node $DD(n,m_n)$ at the searched level n. If the active detailed node $DD(n,m_n)$ at the searched level n is then storing a number of signals equal to the corresponding threshold number of signals $K_m$ax, a suitable method will also include closing the active detailed node $DD(n,m_n)$ at the searched level n by assigning the end time $t_{end}$ of that signal as the node end time $tD_{end}(n,m_n)$, and opening a new active detailed node $DD(n, m_{n+1})$.

The method of FIG. 7 does not generate a tree structure. Instead, each level n of the detailed database DD is effectively independent of the levels n±1 below and/or above. However, this is not essential and in other examples the detailed database DD may take the form of a tree-structure (not shown), for example binary, ternary and so forth. In such examples, the detailed node time periods $\Delta t_D(n,m_n)$ of a level n will be equal to each other, and also to a multiple of the node time periods $\Delta t_D(n-1,m_{n-1})$ of the level n−1 below (excepting a leaf level). Such tree-structured detailed databases DD can still be built in real-time as data is obtained, for example, using the methods disclosed in WO 2021/171018 A1 (referring in particular to the methods described in relation to FIGS. 2 to 4).

Method of Processing a Query Using the Detailed Database

In the general case of processing the query using the detailed database DD, starting from the lowest level of the detailed database DD, successively increasing levels n of the detailed database DD are searched and signal data 14 of each signal which matches all the query fields $t_{start}$, $t_{end}$, and one or more ranges $\Delta p_1, \Delta p_2, \ldots, \Delta p_P$ of the signal properties $p_1, p_2, \ldots, p_P$ is added to a detailed query result $qD_{res}$. A range $\Delta p_P$ does not need to be specified for every signal property $p_P$, for example a user may wish to recover all signals having frequencies within a given range, without concern about any other signal properties pp.

Figure 8:
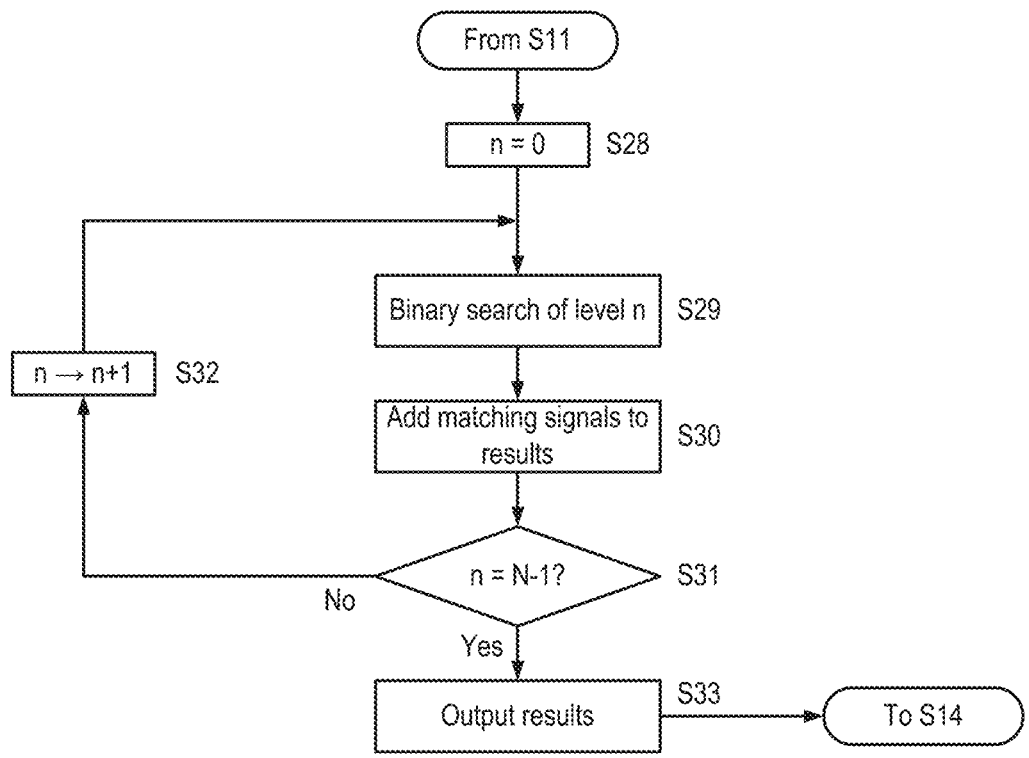
FIG. 8 shows a process flow diagram for a method of processing a query using a detailed database produced using the method of FIG. 7.

Referring also to FIG. 8, a process flow diagram is shown for a method of processing a query using a detailed database DD corresponding to the detailed database DD structured as illustrated in FIGS. 6B and 6C and produced using the method of FIG. 7.

When processing the query using the detailed database DD (i.e. following step S11|No in FIG. 5), starting from the lowest level n=0 of the detailed database DD (step S28), at each level n a search (for example a binary search) of that level n is conducted (step S29), and the signal data 14 of each signal which matches all the query fields $t_{start}$, $t_{end}$, and the one of more ranges $\Delta p_1, \Delta p_2, \ldots, \Delta p_P$ of the signal properties $p_1, p_2, \ldots, p_P$ is added to the detailed query result $qD_{res}$ (step S30). If the searched level n is not the maximum level N−1 (step S31|No), the level is incremented to n+1 and the next level searched. Once the searched level n is the maximum level N−1 (step S31|Yes), the detailed query result $qD_{res}$ is output (step S33) for display/storage etc (step S14).

In this way, each level n may be swiftly searched, and results from any/all of the levels 0≤n≤N−1 are found and added to the detailed query result $qD_{res}$.

A signal (i.e. the corresponding signal data 14) matches all of the query fields if it has a start time $t_{start}$ after the query start time $tQ_{start}$, has an end time $t_{end}$ before the query end time $tQ_{end}$, and has signal properties $p_1, p_2, \ldots, p_P$ within the corresponding received one or more ranges $\Delta p_1, \Delta p_2, \ldots, \Delta p_P$ of the signal properties $p_1, p_2, \ldots, p_P$. $\Delta p_1, \Delta p_2, \ldots, \Delta p_P$ of the signal properties $p_1, p_2, \ldots, p_P$ The detailed query result $qD_{res}$ may include, or take the form of, a list of the start times $t_{start}$, end times $t_{end}$ and corresponding signal properties $p_1, p_2, \ldots, p_P$ of each signal found in the detailed database DD matching the query fields $t_{start}$, $t_{end}$, $\Delta p_1, \Delta p_2, \ldots, \Delta p_P$.

The method of processing a query using the detailed database DD may include aggregating one or more signal properties $p_1, p_2, \ldots, p_P$ stored in the detailed query result $qD_{res}$. The signal properties $p_1, p_2, \ldots, p_P$ to be aggregated may be predetermined, or may be selected by a user when preparing the query at the time of running the query. Signal properties $p_1, p_2, \ldots, p_P$ may be aggregated to generate, based on the values stored in the detailed query result $qD_{res}$, one or more of histograms, bar charts scatter plots, surface plots and so forth. For example, two-dimensional histograms as shown in FIGS. 3A and 3B. Aggregating may include using the detailed query result $qD_{res}$ to populate a aggregated data structure $D_{agg}$ which stores, for each unique combination of a subset of the quantised signal property values $p_1, p_2, \ldots, p_P$, a count of the number of signals in the detailed query result which have that unique combination of the subset of the quantised signal property values $p_1, p_2, \ldots, p_P$. In other words, the aggregated data structure $D_{agg}$ for the detailed query result $qD_{res}$ may be analogous to the summary data structures SUM of the summary database, except populated using the detailed query result $qD_{res}$ instead of the signals corresponding to a summary node period $\Delta t_S(n,m_n)$.

The aggregated data structure $D_{agg}$ may be updated every time a new signal matching the query fields is found in the detailed database DD and added to the detailed query result $qD_{res}$. Alternatively, the aggregation of one or more signal properties may be updated in response to the number of results added to the detailed query result $qD_{res}$ since last updating the aggregation is equal to a threshold value. A list is preferably reset after updating the aggregation of one or more signal properties $p_1, P_2, \ldots, p_P$ in the aggregated data structure $D_{agg}$.

First Method of Storage to the Summary Database

Referring also to FIGS. 9 to 12, a first exemplary method of building the summary database SD is illustrated.

FIG. 9 schematically illustrates the structure of the tree structure of the summary database, and FIG. 10 schematically illustrates the structure of a single summary node $SD(n,m_n)$.

FIG. 11 shows a process flow diagram of the first exemplary method of building the summary database SD, and FIG. 12 shows a process flow diagram for a method of propagating data to higher levels n within the tree structure (used at step S40 in FIG. 11).

Referring in particular to FIG. 9 a binary tree structure of summary nodes $SD(n,m_n)$ will be referred to in explaining the first exemplary method. However, other types of tree structure may be used instead, such as ternary, quaternary and so forth. Each leaf summary node $SD(0,m_n)$ has an equal duration $\Delta t_S(0,m_n)=\Delta \tau$. In the first exemplary method, the summary database SD comprises, at the lowest level, up to a number $M_b$ of active leaf summary nodes $SD(0,m_n)$ corresponding to a summary buffer period $\Delta t_{buff}=M_b\Delta \tau$, and any number of closed leaf summary nodes corresponding to earlier summary node periods. The summary buffer period $\Delta t_{buff}$ is independent of the buffers BuffR used in acquiring the time series of radio data $E_r$.

For example, referring in particular to FIG. 9, if the present time t is during leaf summary node SD(0,8), i.e. $\tau_7 \leq t < \tau_8$, then a summary buffer of length $M_b=4$ would include nodes SD(0, 5), SD(0, 6), SD(0, 7) and SD(0, 8). The summary buffer period $\Delta t_{buff}$ is important for the handling of relatively longer signals in the first exemplary method.

Referring in particular to FIG. 10, each summary node $SD(n,m_n)$ includes a summary data structure SUM. In the example illustrated, the summary data structure SUM takes the form of a listing, wherein the $j^{th}$ of J unique combinations $p_{1,j}, p_{2,j}, \ldots, p_{P,j}$ of the signal properties $p_1, p_2, \ldots, p_P$ stored in the structure SUM has a corresponding count value Cy and carry-over value $CO_j$. The carry-over values $CO_j$ are only used internally in the first exemplary method. In practice, the same data need not be stored as a list, and may instead be stored as an array, a hashmap, or any other suitable data storage structure.

Referring in particular to FIG. 11, the first exemplary method shall be explained. For the sake of explanation, SD(0,m) corresponds to the most recent leaf summary node, and $SD(0,m-M_b+1)$ corresponds to the oldest. The leaf summary nodes $SD(0,m-M_b+1), \ldots, SD(0,m-1), SD(0,m)$ are the active summary nodes, and all other summary nodes at the leaf level n=0 are closed.

The first exemplary method of building the summary database follows detection of a signal (step S2) and determination of the signal data 14 (step S4) including the at least the signal start time $t_{start}$, the signal end time $t_{end}$, and the values of the one or more signal properties $p_1, p_2, \ldots, p_P$.

The signal data 14 is received (step S34). If the start time $t_{start}$ and end time $t_{end}$ of the signal are wholly within the summary buffer period $\Delta t_B$ (step S35 Yes), then the summary data structures SUM are updated for every active leaf summary node $SD(0,m_o-M_b+1), \ldots, SD(0,m_o-1), SD(0,m_o)$ having a summary node period $\Delta t_S(o,m_o)$ overlapping the duration $d=t_{start}-t_{end}$ of the signal (step S36). For example, assuming that the level of quantisation in the summary data structures SUM corresponds to the smallest measurable difference in the signal properties $p_1, p_2, \ldots, p_P$ of the signal, if a matching row $p_{1,j}, p_{2,j}, \ldots, p_{P,j}$ already exists, the count value $C_j$ is simply increased by one, i.e. $C_j \rightarrow C_j+1$. However, if a matching row $p_{1,j}, p_{2,j}, \ldots, p_{P,j}$ does not already exist, it is added and the new count value $C_j$ initialised at one, i.e. $C_j=1$.

The carry-over values $CO_j$ for each row denoting how many signals having the identical combination of signal properties $p_1, p_2, \ldots, p_P$ (up to the quantisation/binning) were also present in the preceding summary node $SD(n,m_n)$. For example, if a signal started during SD(o,m−M+1) and finished during SD(o,m−2), then for the corresponding combination of signal properties $p_1, p_2, \ldots, p_P$ in the summary data structures SUM, one would be added to the count values C in each of the summary nodes SD(0,m−M+1) to SD(0,m−2), but the carry-over count would only be incremented for each of the summary nodes SD(0,m−M+2) to SD(0,m−2). In other words, the carry-over count is not incremented in the summary data structure SUM corresponding to the leaf summary node $SD(o,m_n)$ during which a signal started. These carry-over counts $CO_j$ are used in the first method of propagating summary data illustrated in FIG. 12 (and further described hereinafter).

If the start time $t_{start}$ and end time $t_{end}$ of the signal are not wholly within the summary buffer period $\Delta t_B$ (step S35|No), and the end time $t_{end}$ of the signal is within the summary buffer period $\Delta t_B$ (i.e. the start time $t_{start}$ of the signal is before the summary buffer period $\Delta t_B$) (step S37|No), then the signal data 14 of the signal is stored to an auxiliary database AD (step S38). The auxiliary database AD is preferably built using the same structure and methods as the detailed database, for example, using the structure and methods shown in FIGS. 6B, 6C and 7. Whilst a significant majority of signals can be captured in the summary data structures SUM of the summary nodes $SD(n,m_n)$ when the durations are set appropriately, some cannot and are stored in the auxiliary database to prevent loss of data fidelity. This approach allows aggregating nearly all data, meaning that the number of signals leftover in the auxiliary database remains manageable.

If the start time $t_{start}$ and end time $t_{end}$ of the signal are not wholly within the summary buffer period $\Delta t_B$ (step S35|No), and the end time $t_{end}$ of the signal is after the summary buffer period $\Delta t_B$ (step S37|Yes), the buffer period $\Delta t_B$ is advanced and the checks (step S35, S37) are repeated until either:

the summary data structures SUM are updated for every active leaf summary node $SD(0,m_o-M_b+1)$, . . . , $SD(0,m_o-1)$, $SD(0,m_o)$ having a summary node period $\Delta t_S(0,m_o)$ overlapping the duration $d=t_{start}-t_{end}$ of the signal (step S36); or the signal data 14 corresponding to the signal is stored into the auxiliary database AD.

In the particular example shown in FIG. 11, the shifting of the buffer period $\Delta t_B$ is accomplished by adding the next leaf summary node $SD(0,m_o+1)$ (step S39) and, provided the summary buffer is already full (step S40 Yes), The data in leaf summary node $SD(0,m_o-M_b+1)$ is propagated to levels n>0 (step S41). The propagation step (step S41) may also include adding a new top level (i.e. increasing N), and is described in further detail in FIG. 12. The carry-over values $CO_j$ are used when propagating data to prevent overcounting signals. Once data has been propagated to levels n>0 (step S41), the buffer is shifted by incrementing the index $m_o \rightarrow m_o+1$ (step S42) before returning to the first test (step S35). If the buffer is not yet filled (step S40|No), the propagation (step S41) is skipped until the buffer is filled (this is only relevant in the first $M_b$ leaf summary node periods $\Delta t_S(0,m_n)$).

The oldest summary node $SD(o, m_o-M_b+1)$ may also be written/saved to a storage device 6, or flagged as read only, when shifted out of the summary buffer. In practice this may not require doing anything specific beyond carrying out the steps (39 to S42).

The propagation of data to levels n>0 (step S41) generally involves propagating the corresponding summary data structure SUM of node $SD(0,m_o-M_b+1)$ to all higher level n>0 summary nodes $SD(n>0,m_n)$ from which the oldest active leaf summary node $SD(0,m_o-M_b+1)$ is a descendant. The propagation (step S41) must enforce the condition that each summary node $SD(n>0,m_n)$ only counts each signal once in the respective summary data structure SUM. This is accomplished in the first exemplary method by using the carry-over counts $CO_j$ to track signals extending over multiple summary nodes $SD(n,m_n)$.

For example, referring in particular to FIG. 12, the propagation of summary node $SD(n,m_n)$ data to higher levels shall be described.

The method of propagation may be carried out relative to any level n, and indeed is carried out at step S49 of the method illustrated in FIG. 12. In other words, the process of propagation of data in summary nodes $SD(n,m_n)$ to higher levels n>0 may be recursive as needed.

Data is only propagated to the most recent summary node $SD(n,m_n)$ for n>0, with that node being added if necessary.

A command is received to propagate data of a node $SD(n,m_n)$ to higher levels (step S43). For example, this is applied to the summary node $SD(0,m_o-M_b+1)$ at step S41 in FIG. 11, and to the data of a summary node $SD(n+1,m_{n+1})$ at step S49 of FIG. 12. The data to be propagated is at least the summary data structure SUM, but may include further data in other examples.

It is tested whether the summary node time period $\Delta t_S(n, m_n)$ of the propagated node $SD(n,m_n)$ fits wholly within summary node time period $\Delta t_S(n,m_n)$ of the most recent summary node $SD(n+1,m_n+)$ at the next level up n+1 (step S44). In other words, whether $tS_{start}(n+1,m_{n+1}) < tS_{start}(n, m_n) < tS_{end}(n+1,m_{n+1})$ and $tS_{start}(n+1,m_{n+1}) < tS_{end}(n,m_n) \le tS_{end}(n+1,m_n+)$.

If the summary node time period $\Delta t_S(n,m_n)$ of the propagated node $SD(n,m_n)$ wholly fits (step S44|Yes) and the node at level n+1 is newly generated (step S45|Yes), i.e. created since step S43 of the current execution of the propagation method, then the data from the propagated node $SD(n,m_n)$ is added to the node $SD(n+1,m_{n+1})$ (step S46). In other words, the summary data structure SUM of propagated node $SD(n, m_n)$ is added to the (in this case blank) summary data structure SUM of node $SD(n+1,m_{n+1})$.

However, if the summary node time period $\Delta t_S(n,m_n)$ of the propagated node $SD(n,m_n)$ wholly fits (step S44|Yes) but the node at level n+1 already existed (step S45|No), the data from the propagated node $SD(n,m_n)$ is added to the node $SD(n+1,m_{n+1})$ with the carry-over values $CO_j$ subtracted (step S47). In other words, the summary data structure SUM of propagated node $SD(n,m_n)$ is added to the summary data structure SUM of node $SD(n+1,m_{n+1})$ after first subtracting the carry-over values $CO_j$ from corresponding count values Cy. Carry-over values $CO_j$ are also used for levels n>0 to prevent overcounting when propagating from level n to n+1.

When the summary node time period $\Delta t_S(n,m_n)$ of the propagated node $SD(n,m_n)$ does not wholly fit within the summary node time period $\Delta t_S(n,m_n)$ of the most recent summary node $SD(n+1,m_{n+1})$ at the next level up n+1(step S44|No), the most recent summary node $SD(n+1, m_n+_1)$ at level n+1 is closed (step S48). This may involve writing the summary node $SD(n+1, m_n+_1)$ to a storage device 6 or flagging as read only, but in practice may not require doing anything specific beyond carrying out the following steps (S49 to S51). The data in summary node $SD(n+1, m_{n+1})$ is propagated to levels n+2 and higher (step S49), which is in practice a command (step S43) to propagate node $SD(n+1, m_n+_1)$. Once data has been propagated to levels n+2 and higher (step S49), the most recent summary node $SD(n+1, m_{n+1})$ is shifted by adding the next summary node $SD(n+1,m_{n+1}+1)$ (step S50) and incrementing the index $m_{n+1} \rightarrow m_{n+1}+1$ (step S51) before returning to the initial test (step S44).

Alternatively, any other suitable method for propagating the summary data structures SUM to higher levels n>0 whilst avoiding double counting of signals may be used.

Figure 13A:
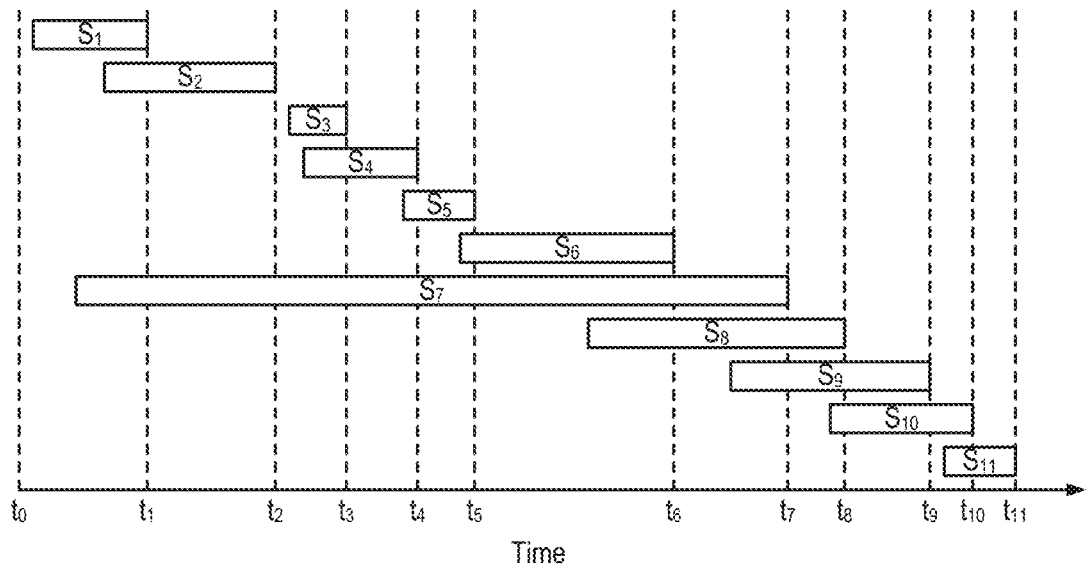
FIG. 13A is the same as FIG. 6A, FIG. 13B schematically illustrates a tree structure of a summary database generated using the first exemplary method shown in FIG. 11, and FIG. 13C schematically illustrates an auxiliary database of the summary database generated using the first exemplary method shown in FIG. 11.
Figure 13B:
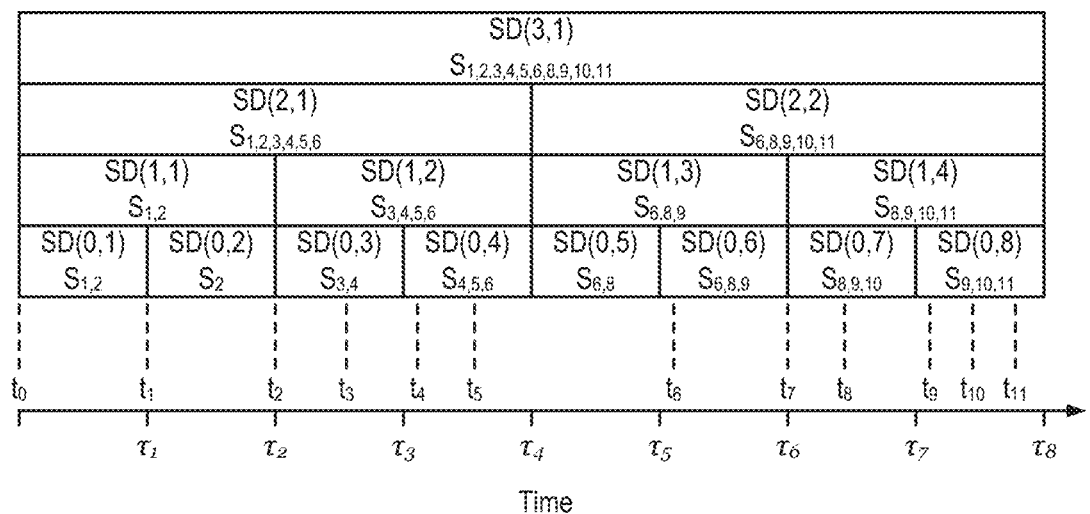
Figure 13C:
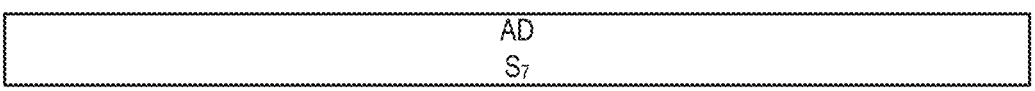

Referring also to FIGS. 13A to 13C, a worked example of applying the first exemplary method of building the summary database SD will be explained. FIG. 13A reproduces FIG. 6A for convenience in comparing with FIGS. 13B and 13C. FIG. 13B schematically illustrates the tree structure of the summary database SD generated for the signals shown in FIG. 13A using the first exemplary method, and FIG. 13C schematically illustrates the auxiliary database of the summary database SD generated for the signals shown in FIG. 13A using the first exemplary method.

In FIGS. 13B and 13C, the notation $S_{4,5,6}$ denotes for brevity the signals $S_4$, $S_5$ and $S_6$. Similarly, $S_{6,8}$ denoted signals $S_6$ and $S_8$, and so forth. A buffer size $M_b=4$ was used for the following.

Initially, only one summary leaf node SD(0,1) exists. At time $t_1=\tau_1$, the first signal $S_1$ ends. The index $m_o=1$ and signal $S_1$ is wholly within the period $\Delta t_S(0,1)$ (step S35|Yes). The signal $S_1$ only overlaps leaf summary node SD(0,1) (and there are not yet other leaf summary nodes $SD(0,m_o)$ in the summary buffer), so the signal properties $p_1, p_2, \ldots, p_P$ of signal $S_1$ are added to the summary data structure SUM of leaf summary node SD(0,1) (step S36).

Signal $S_2$ ends at time $t_2$, and as not yet updated the index $m_o=1$ still. Therefore, signal $S_2$ is not wholly within the summary buffer period $\Delta t_B=\Delta t_S(0,1)$ (step S35|No), and ends after the present end of $\Delta t_B$ which is at $\tau_1$ (step S37|Yes). Through steps S39 to S42, new leaf summary node SD(0,2) is added, and as the summary buffer is not yet full (step S40|No), propagation (step S41) is skipped and $m_o$ is updated to $m_o=2$ (step S42). The end of the summary buffer is now at $\tau_2$, corresponding to both SD(0,1) and SD(0,2) being within the summary buffer. The signal $S_2$ is now wholly within the updated summary buffer period $\Delta t_B$ ending at $\tau_2$, and the signal properties $p_1, p_2, \ldots, p_P$ of signal $S_2$ are added to the summary data structures SUM of both leaf summary nodes SD(0,1) and SD(0,2) which are within the summary buffer and with overlap $S_2$ (step S36). Carry-over count is added to the summary data structure SUM of SD(0,2) because $S_2$ is carried over from SD(0,1).

Signal $S_3$ ends at time $t_3$, at which time the summary buffer covers from $t_0$ to $\tau_2$. Applying the method of FIGS. 11 and 12, the buffer is expanded by adding SD(0,3), and the signal properties $p_1, p_2, \ldots, p_P$ of signal $S_3$ are added to the summary data structure of SD(0,3). Signal $S_4$ ends at time $t_4$, and again the summary buffer is expanded by adding SD(0,4). The summary buffer is now filled, and any further additions will involve removing SD(0,1) from the end. The signal properties $p_1, p_2, \ldots, p_P$ of signal $S_4$ are added to the summary data structures of both SD(0,3) and SD(0,4) which overlap the signal, with SD(0,4) also including a carry-over count CO. Signal $S_5$ ends at time $t_5$, which remains within the summary buffer period of $\Delta t_B$ and the signal properties $p_1, p_2, \ldots, p_P$ of signal $S_5$ are added to the summary data structure of SD(0,4).

Signal $S_6$ ends at time $t_6$, after the end of the summary buffer at $T_4$. New leaf summary nodes SD(0,5) and SD(0,6) are added iteratively before signal $S_6$ fits within the new summary buffer covering SD(0,3) to SD(0,6), and the signal properties $p_1, p_2, \ldots, p_P$ of signal $S_4$ are added to the summary data structures of each of SD(0,4), SD(0,5) and SD(0,6) which overlap the signal. When SD(0,1) is removed from the end of the summary buffer, level n=1 node SD(1,1) is opened and the summary data structure SUM of SD(0,1) is copied over. When SD(0,2) is subsequently shifted from the end of the summary buffer, the summary data structure SUM is propagated, but will not change the data of SD(1,1), because the carry-over value CO of signal $S_2$ will cancel the count value C and prevent double counting of signal $S_2$ in SD(1,1).

Signal $S_7$ ends at time $t_7$, coinciding with the end of the summary buffer at $\tau_4$. However, referring in particular to FIG. 13C, since signal $S_7$ ends within the summary buffer and started before it (step S35|No followed by step S37|No), the signal data 14 of signal $S_7$ are instead stored to the auxiliary database AD.

The tree structure of summary nodes SD(n,$m_n$) continues to be built up in this way, as shown in FIG. 13B. When the reception of the time series of radio data $E_r$ finishes, the remaining leaf summary nodes SD(o,$m_n$) in the summary buffer are propagated, one at a time from oldest to newest, followed by adding any summary nodes SD(n,$m_n$) necessary to complete the tree structure with a single root node SD(N−1,1).

First Method of Querying the Summary Database

Figure 14:
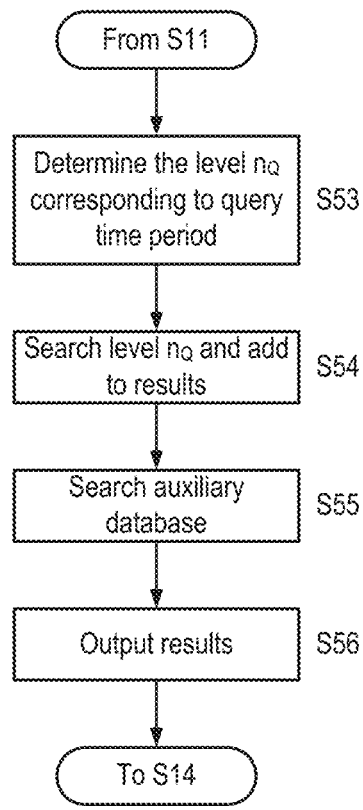
FIG. 14 shows a process flow diagram for a method of processing a query using a summary database produced using the method of FIG. 11.

Referring also to FIG. 14, a process flow diagram is shown for a method of processing a query using a summary database SD corresponding to the summary database SD structured as illustrated in FIGS. 9 and 10 and produced using the method of FIGS. 11 and 12.

When processing the query using the summary database SD (i.e. following step S11|Yes in FIG. 5), the query processing level $n_Q$ of the summary database SD tree structure is determined based on the query time period $\Delta t_Q$ (step S53). The query processing level $n_Q$ may be a level of the summary database SD tree structure for which the time period $\Delta t_S(n_Q,m_n)$ corresponding to each summary node has the minimum difference to a predetermined or dynamically determined fraction of the query time period $\Delta t_Q$. For example, the predetermined fraction may be ⅕₀ and ⅟₁₀₀₀, so that the query processing level $n_Q$ may correspond to a level at which the time period $\Delta t_S(n_Q,m_n)$ corresponding to each summary node is closest to equaling the predetermined fraction of the query time period $\Delta t_Q$.

For each summary node SD($n_Q,m_{n_Q}$) at the query processing level $n_Q$ having a summary node period $\Delta t_S(n_Q,m_n)$ overlapping the query time period $\Delta t_Q$, any entry in the corresponding summary data structure SUM which matches the query fields, $t_{start}$, $t_{end}$, and any specified ranges $\Delta p_1$, $\Delta p_2, \ldots, \Delta p_P$, is added to the summary query result $qS_{res}$ (step S54). The search in time can only use the summary node time data $tS_{start}(n,m_n)$, $tS_{end}(n,m_n)$, $\Delta t_S(n_Q,m_n)$ because the summary nodes SD($n_Q,m_n$Q) do not store the individual signal start and end times tstart, tend.

The auxiliary database AD is also searched to find any signal data 14 stored therein and matching the query fields (step S55). Any matches are processed to add the signal data to the summary query result $qS_{res}$.

The summary query result $qS_{res}$ is output (step S56) for display/storage etc (step S14).

In this way, the summary database SD may be quickly searched at a query level $n_Q$ which is set based on the query time period $\Delta t_Q$, meaning that the search will be conducted at a pre-existing level of aggregation, saving considerable time and processing operations. For many purposes, in particular but not limited to preparing visualisations such as graphs or heat maps, conducting the query as a finer timescale would in any event be pointless due to finite resolution of an output display and/or a perceptibility to a user.

The summary query result $qS_{res}$ may take the form of a list. When an entry in the summary data structure SD which matches the query fields is found, a new entry may be added to the list including the unique combination of quantised signal property values $p_1, p_2, \ldots, p_P$ corresponding to that entry and corresponding summary node start $tS_{start}(n,m_n)$ and end $tS_{end}(n,m_n)$ times. When signals are added from the auxiliary database AD, a new entry may be added to the list including the signal property values corresponding to that signal data 14, and corresponding signal start $t_{start}$ and end $t_{end}$ times, and the count value Cy may be assigned as 1 (one).

The method may include aggregating one or more signal properties stored in the summary query result in the same way as aggregating signal as for signal properties stored in the detailed query result. Aggregating one or more signal properties stored in the summary query result may be additionally weighted based on the count number corresponding to each entry.

Second Method of Storage to the Summary Database

Figure 15:
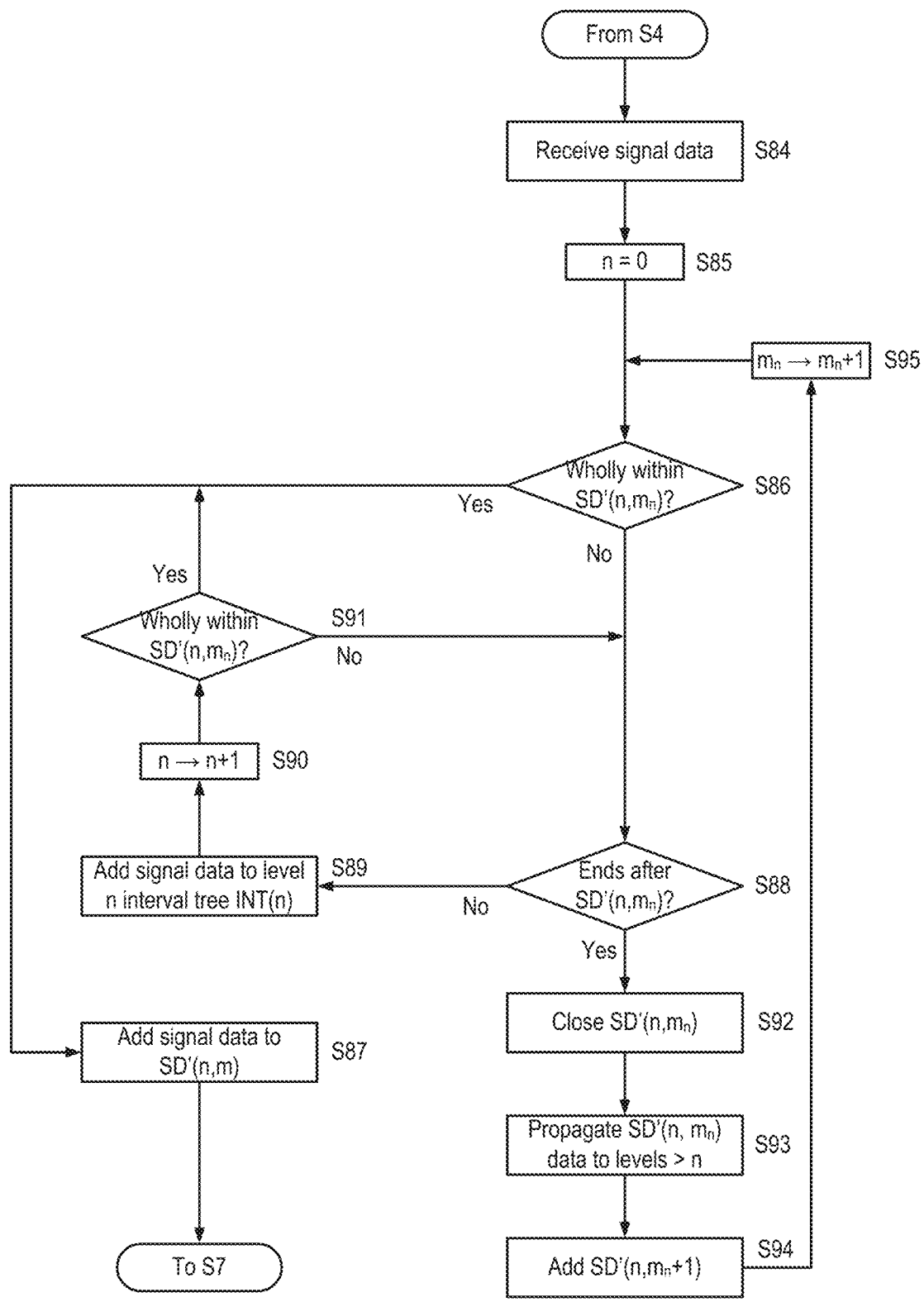
FIG. 15 shows a process flow diagram for a second exemplary method of building a summary database.
Figure 16:
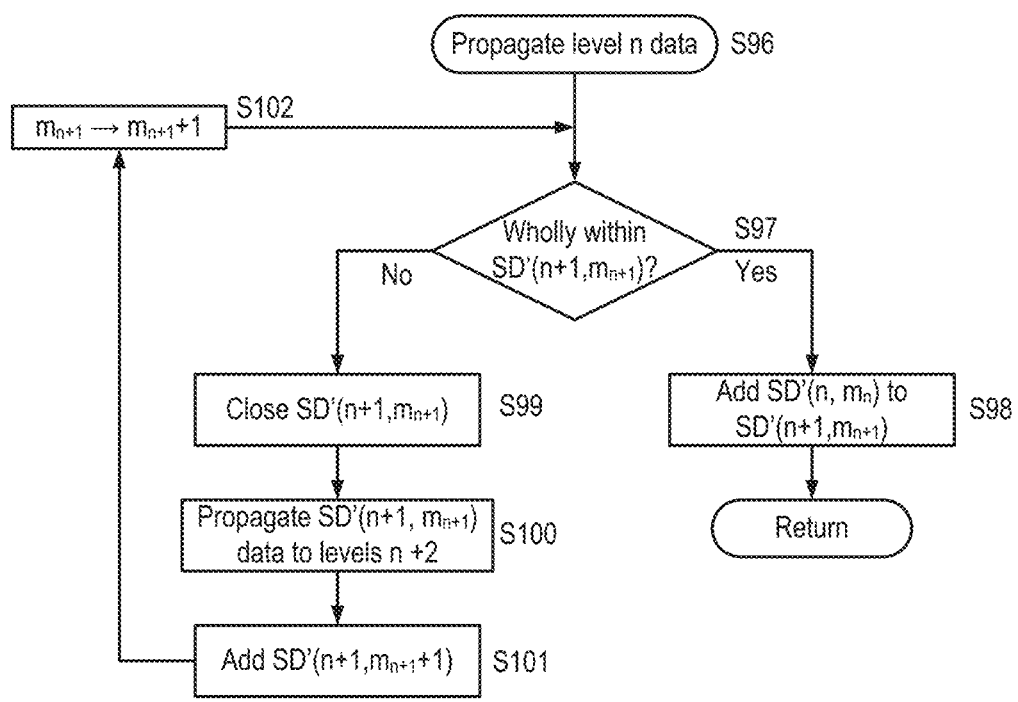
FIG. 16 shows a process flow diagram for a method of propagating data to higher levels within a tree structure as part of the method of FIG. 15.

Referring also to FIGS. 15 and 16, a second exemplary method of building the summary database SD is illustrated.

FIG. 15 shows a process flow diagram of the second exemplary method of building the summary database SD, and FIG. 16 shows a process flow diagram for a method of propagating data to higher levels n within the tree structure (used at step S93 in FIG. 15).

The summary nodes generated using the second exemplary method are denoted SD'(n,$m_n$), and are the same as those produced using the first exemplary method (FIGS. 11 and 12), except that the summary data structures SUM do not include carry-over count values CO$_j$. The second exemplary method avoids the need for carry-over values and avoids using a summary buffer. Instead, the tree structure is searched (and/or added to) to find the lowest level n at which a detected signal is entirely encompassed by a summary node SD'(n,m$_n$) period $\Delta t_S$(n,m$_n$). An auxiliary database AD is still used to store any signals which cannot be fitted into the nodes SD'(n,m$_n$) at each level n (for example because they span a boundary between nodes at that level).

In the second exemplary method, each level of the summary database SD' tree structure includes one active summary node SD'(n,m$_n$) corresponding to the current maximum value of index m$_n$, and any number of closed summary nodes, SD'(n,m$_n$–1), SD'(n,m$_n$–2) and so forth. The active summary node SD'(n,m$_n$) at each level n is the most recent. In the second exemplary method, the auxiliary database AD' takes the form of a separate interval structure INT(n) corresponding to each level n of the summary database SD'.

The second exemplary method of building the summary database follows detection of a signal (step S2) and determination of the signal data 14 (step S4) including the at least the signal start time t$_{start}$, the signal end time t$_{end}$, and the values of the one or more signal properties p$_1$, p$_2$, . . . , p$_P$.

The signal data 14 is received (step S84). Starting from the lowest level n=0 (step S85), successively increasing levels n of the summary database SD' tree structure are searched.

If the start t$_{start}$ and end t$_{end}$ time of the signal are within the summary node period $\Delta t_S$(n,m$_n$) corresponding to the active summary node SD'(n,m$_n$) at the searched level n (step S86 Yes), the signal property values p$_1$, p$_2$, . . . , p$_P$ of the signal are added to the summary data structure SUM of the active summary node SD'(n,m$_n$) at the searched level n (step S87).

If the start time t$_{start}$ of the signal is within the summary node period $\Delta t_S$(n,m$_n$) corresponding to the active summary node SD'(n,m$_n$) at the searched level n and the end time t$_{end}$ is outside the summary node period $\Delta t_S$(n,m$_n$) (step S86 No followed by step S88 Yes), the active summary node SD'(n,m$_n$) at the searched level n is closed (step S92).

This may involve saving/storing the active summary node SD'(n,m$_n$) to one or more storage devices 6 and/or marking it as read-only, but equally may not require specific action beyond carrying out the following stages (steps S93 to S95). The summary data structure SUM of the summary node SD'(n,m$_n$) is propagated to all higher level summary nodes SD'(>n,m$_n$) from which the summary node SD'(n,m$_n$) at the searched level n is a descendant (step S93). The propagation process may include adding new levels n and/or recursive propagation processes, and shall be explained further in relation to FIG. 16 hereinafter. A new active summary node SD'(n, m$_{n+1}$) is added (step S94), and the index m$_n$ incremented to m$_n$+1 (step S95) before returning to the initial test (step S86) to determine whether the signal can fit within the updated active summary node SD'(n,m$_n$) (recalling that m$_n$ has been incremented by one).

If the end time t$_{end}$ of the signal is within the summary node period $\Delta t_S$(n,m$_n$) corresponding to the active summary node SD'(n,m$_n$) at the searched level n and the start time t$_{start}$ is outside the summary node period $\Delta t_S$(n,m$_n$) (step S86 No followed by step S88|No), then the signal data 14 of the signal is added to the interval structure INT(n) corresponding to the searched level (step S89) and the searched level n is increased by one to n+1 (step S90). The interval structure INT(n) for each level n need not be a tree structure, and alternatively the interval structure INT(n) for each level n may have the same structure as the detailed database DD (and be built the same way).

If the start t$_{start}$ and end t$_{end}$ time of the signal are within the summary node period $\Delta t_S$(n,m$_n$) corresponding to the active summary node SD'(n,m$_n$) at the increased searched level n (step S91|Yes—recalling that n was incremented in the preceding step), the signal property values p$_1$, p$_2$, . . . , p$_P$ of the signal are added to the summary data structure SUM of the active summary node SD'(n,m$_n$) at the incremented searched level n (step S87). If a first summary node SD(n,1) at the incremented level n does not exist, it is generated. However, if the start t$_{start}$ and end t$_{end}$ time of the signal still do not fit within the summary node period $\Delta t_S$(n,m$_n$) corresponding to the active summary node SD'(n,m$_n$) at the incremented searched level n (step S91|No), the process returns to the second test (step S88).

In this way, each level n is iteratively searched until the signal property values p$_1$, p$_2$, . . . , p$_P$ of the signal can be stored to the summary data structure SUM of a summary node SD'(n,m$_n$) encompassing the signal start t$_{start}$ and end t$_{end}$ time. At each level below this the signal data 14 is stored to the respective interval structure INT(n).

Referring in particular to FIG. 16 the propagation of summary node SD'(n,m$_n$) data to higher levels shall be described.

The method of propagation may be carried out relative to any level n, and indeed is carried out at step S100 of this method of FIG. 16. In other words, the process of propagation of data in summary nodes SD'(n,m$_n$) to higher levels n>0 may be recursive as needed.

Data is only propagated to the most recent summary node SD'(n,m$_n$) at each level, with new nodes being added if necessary.

A command is received to propagate data of a node SD'(n,m$_n$) to higher levels (step S96). For example, this is applied to the active summary node SD'(n,m$_n$) at step S93 in the second method shown in FIG. 15, and to the data of a summary node SD'(n+1,m$_{n+1}$) at step S100 of the propagation method shown in FIG. 16. The data to be propagated includes at least the summary data structure SUM, but may include further data in other examples.

It is tested whether the summary node time period $\Delta t_S$(n,m$_n$) of the propagated node SD'(n,m$_n$) fits wholly within summary node time period $\Delta t_S$(n+1,m$_{n+1}$) of the most recent summary node SD'(n+1,m$_{n+1}$) at the next level up n+1 (step S97). In other words, whether tS$_{start}$(n+1,m$_{n+1}$)<tS$_{start}$(n, m$_n$)<tS$_{end}$(n+1,m$_{n+1}$) and tS$_{start}$(n+1,m$_{n+1}$)< tS$_{end}$(n,m$_n$)<tS$_{end}$(n+1,m$_n$+). If a first summary node SD'(n+ 1,1) at the incremented level n+1 does not exist, it is generated.

If the summary node time period $\Delta t_S$(n,m$_n$) of the propagated node SD'(n,m$_n$) wholly fits (step S97|Yes), then the data from the propagated node SD'(n,m$_n$) is added to the node SD'(n+1,m$_{n+1}$) (step S98) and the process ends. In other words, the summary data structure SUM of propagated node SD'(n,m$_n$) is added to the summary data structure SUM of node SD'(n+1,m$_{n+1}$). If the same unique set of signal properties p$_1$, p$_2$, . . . , p$_P$ exists in both, the entries are merged by combining the count values Cy.

When the summary node time period $\Delta t_S$(n,m$_n$) of the propagated node SD'(n,m$_n$) does not wholly fit within the summary node time period $\Delta t_S$(n+1,m$_{n+1}$) of the most recent summary node SD'(n+1,m$_{n+1}$) at the next level up n+1 (step S97|No), the most recent summary node SD'(n+1, m$_n$+$_1$) at level n+1 is closed (step S99). This may involve writing the summary node SD'(n+1, m$_n$+$_1$) to a storage device 6 or flagging as read only, but in practice may not require doing anything specific beyond carrying out the following steps (S100 to S102). The data in summary node SD'(n+1, m$_n$+$_1$) is propagated to levels n+2 and higher (step S100), which is in practice a command (step S96) to propagate node SD'(n+

1, $m_n+_1$). Once data has been propagated to levels n+2 and higher (step S100), the most recent summary node SD'(n+1,$m_{n+1}$) is shifted by adding the next summary node SD'(n+1,$m_{n+1}$+1) (step S101) and incrementing the index $m_{n+1} \rightarrow m_{n+1}+1$ (step S102) before returning to the initial test (step S97).

Alternatively, any other suitable method for propagating the summary data structures SUM to higher levels n may be used (provided that it does not result in double counting).

Figure 17A:
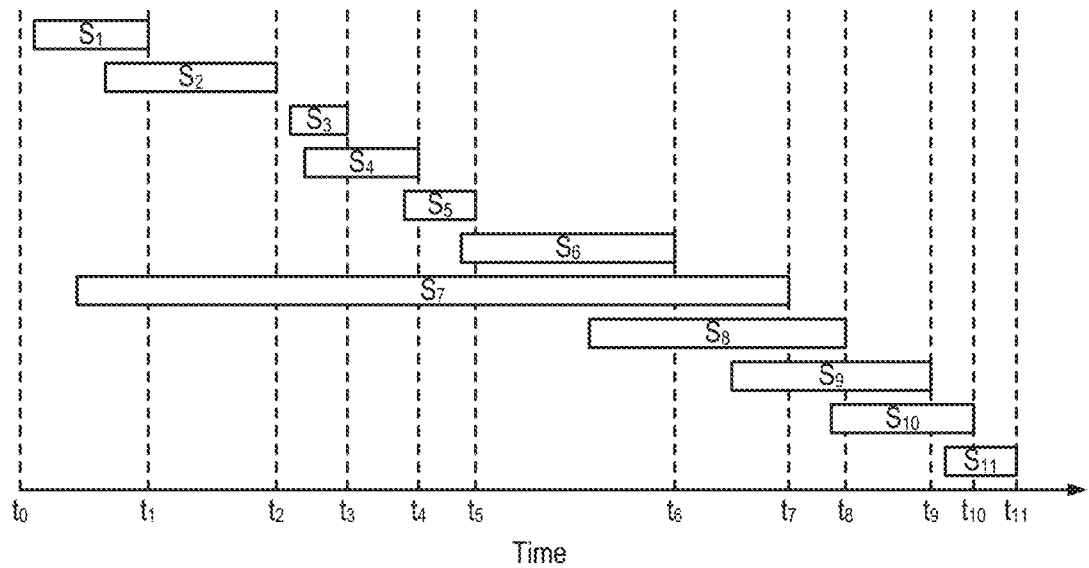
FIG. 17A is the same as FIGS. 6A and 13A, FIG. 17B schematically illustrates a tree structure of a summary database generated using the second exemplary method shown in FIG. 15, and FIG. 17C schematically illustrates an auxiliary database of the summary database generated using the second exemplary method shown in FIG. 15.
Figure 17B:
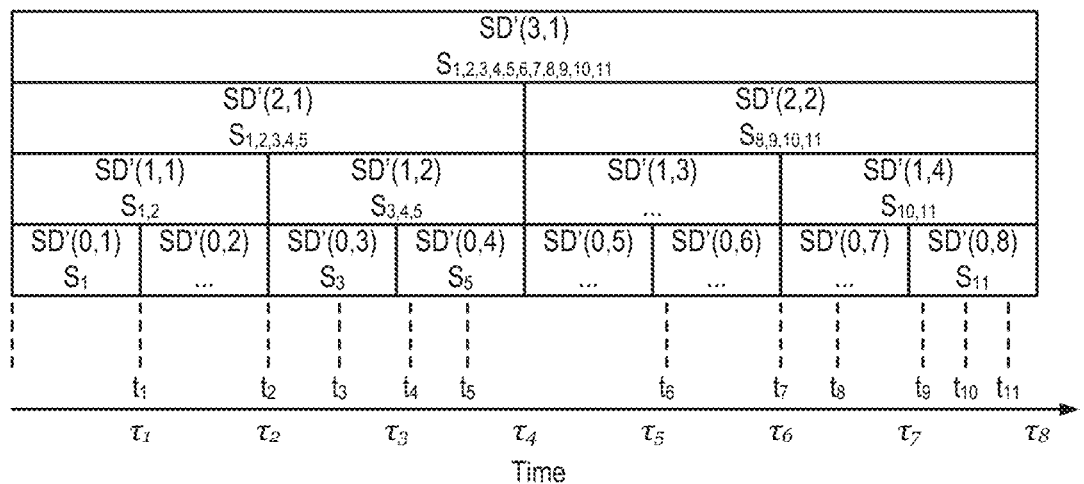
Figure 17C:
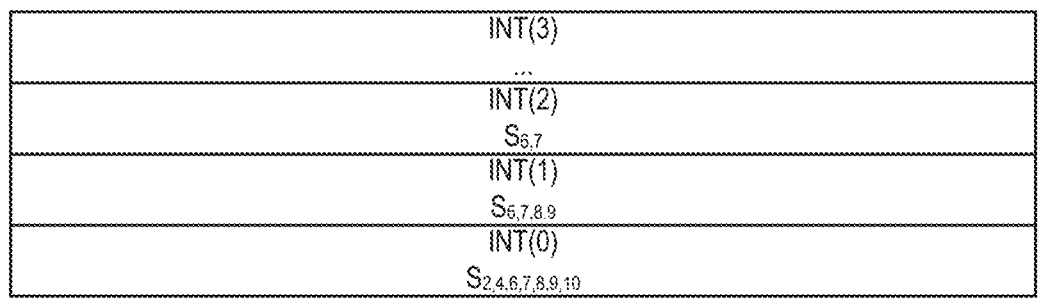

Referring also to FIGS. 17A to 17C, a worked example of applying the second exemplary method of building the summary database SD will be explained. FIG. 17A reproduces FIGS. 6A and 13A for convenience in comparing FIGS. 17B and 17C. FIG. 17B schematically illustrates the tree structure of the summary database SD generated for the signals shown in FIG. 17A using the second exemplary method, and FIG. 17C schematically illustrates the auxiliary database of the summary database SD generated for the signals shown in FIG. 17A using the second exemplary method.

In FIGS. 13B and 13C, the notation $S_{4,5,6}$ denotes for brevity the signals $S_4$, $S_5$ and $S_6$. Similarly, $S_{6,8}$ denoted signals $S_6$ and $S_8$, and so forth.

Initially, only one summary leaf node SD'(0,1) exists. At time $t_1=\tau_1$, the first signal $S_1$ ends. The index $m_o=1$ and signal $S_1$ is wholly within the period $\Delta t_S(0,1)$ (step S86|Yes), so the signal properties $p_1, p_2, \ldots, p_P$ of signal $S_1$ are added to the summary data structure SUM of leaf summary node S(0,1) (step S87).

The second signal $S_2$ does not wholly fit in SD'(0,1) and ends after it (step S86|No followed by step 88|Yes), the data is propagated (step S93), in the process generating level n=1 node SD'(1,1), and the next summary leaf node SD'(0,2) is generated (step S94). The second signal $S_2$ also does not wholly fit in SD'(0,2) (step S86 No followed by step 88|Yes), and so the signal is added to the interval structure INT(0) (step S89) and the n=1 level is searched (step S90). With n=1, it is found that the signal $S_2$ first within node SD'(1,1) (step S91|Yes) and the signal properties $p_1, p_2, \ldots, p_P$ of signal $S_2$ are added to the summary data structure SUM of summary node SD'(1,1) (step S87).

The process continues in this way through signals $S_3$ to $S_{11}$. Referring in particular to FIGS. 17B and 17C, it may be observed that whilst many signals may need to be stored to the interval structure INT(o) at the lowest level n=0, the number of signals quickly drops with increasing level n. Compared to the auxiliary database AD of the first exemplary method, the approach of the second exemplary method means that at longer query time periods $\Delta t_Q$, which will generally be processed at higher query levels $n_Q$, the additional complexity of searching the auxiliary database AD may be reduced or even avoided.

Second Method of Querying the Summary Database

Figure 18:
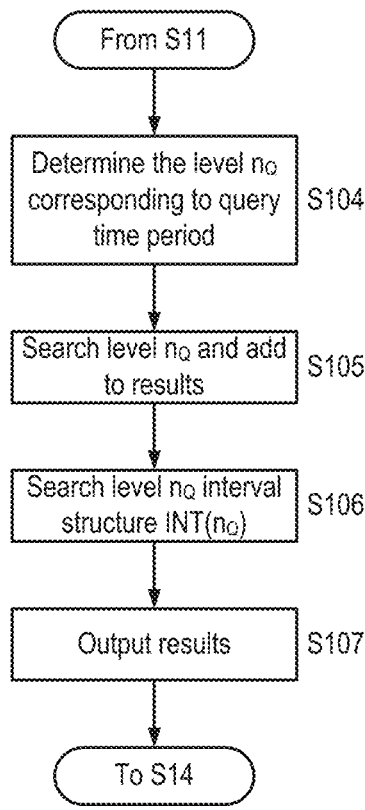
FIG. 18 shows a process flow diagram for a method of processing a query using a summary database produced using the method of FIG. 15.

Referring also to FIG. 18, a process flow diagram is shown for a method of processing a query using a summary database SD' corresponding to the summary database SD' produced using the method of FIGS. 15 and 16.

When processing the query using the summary database SD' (i.e. following step S11|Yes in FIG. 5), the query processing level $n_Q$ of the summary database SD' tree structure is determined based on the query time period $\Delta t_Q$ (step S104). This is the same as the corresponding step S53 shown in FIG. 14.

For each summary node SD'($n_Q, m_{nQ}$) at the query processing level $n_Q$ having a summary node period $\Delta t_S(n_Q, m_n)$ overlapping the query time period $\Delta t_Q$, any entry in the corresponding summary data structure SUM which matches the query fields, $t_{start}$, $t_{end}$, and any specified ranges $\Delta p_1$, $\Delta p_2, \ldots, \Delta p_P$, is added to the summary query result $qS_{res}$ (step S105). This is the same as the corresponding step S54 shown in FIG. 14. The summary query result $qS_{res}$ is structured in the same way as described in relation to FIG. 14, and may be used in the same way(s).

After pulling relevant data from the summary nodes SD'($n_Q,m_{nQ}$), the auxiliary database AD is then also searched to find any signal data 14 stored therein and matching the query fields (step S1o6). Unlike the corresponding step S55 shown in FIG. 14, only the interval structure INT($n_Q$) at the search level $n_Q$ needs to be searched. Any matches are processed to add the signal data to the summary query result $qS_{res}$.

The summary query result $qS_{res}$ is output (step S107) for display/storage etc (step S14). This is the same as the corresponding step S56 shown in FIG. 14.

Third Method of Storage to the Summary Database

Figure 19:
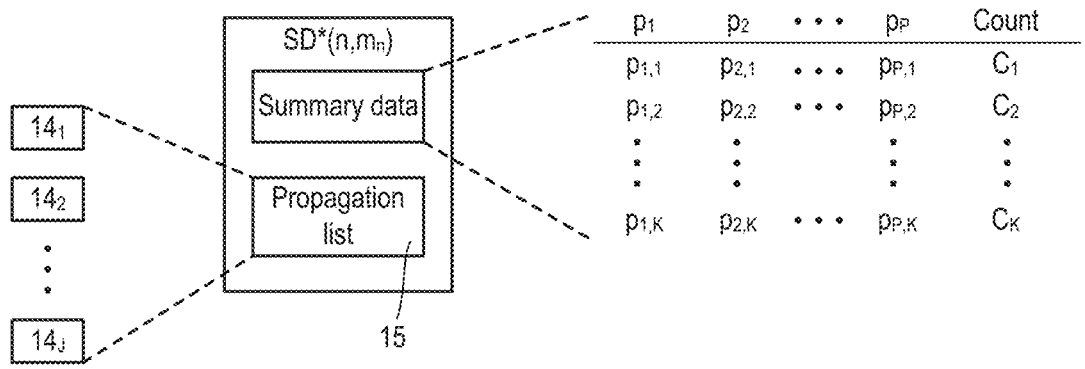
FIG. 19 schematically illustrates the structure of a node of a tree structure of a summary database produced using the method of FIG. 20.
Figure 20:
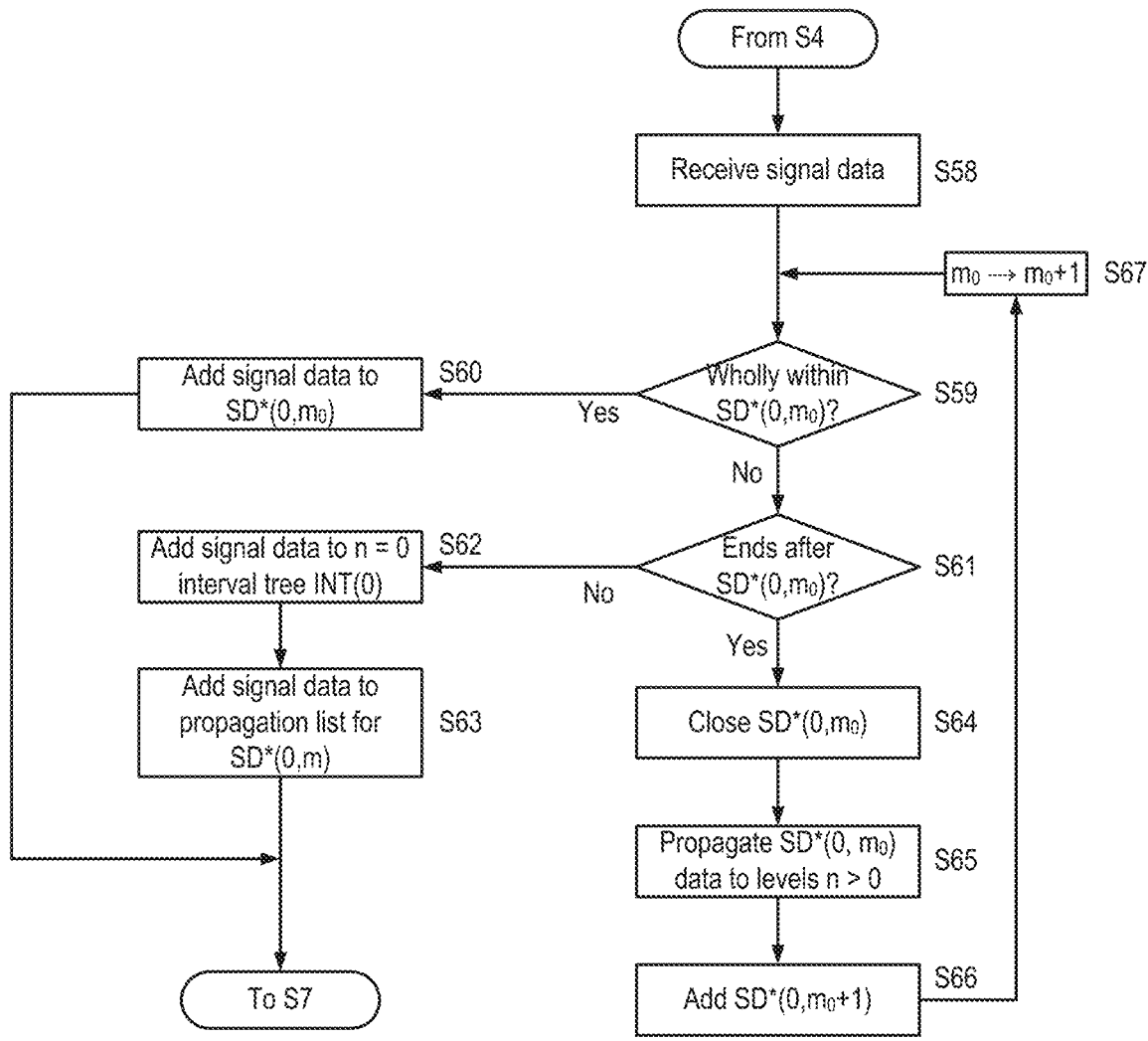
FIG. 20 shows a process flow diagram for a third exemplary method of building a summary database.
Figure 21:
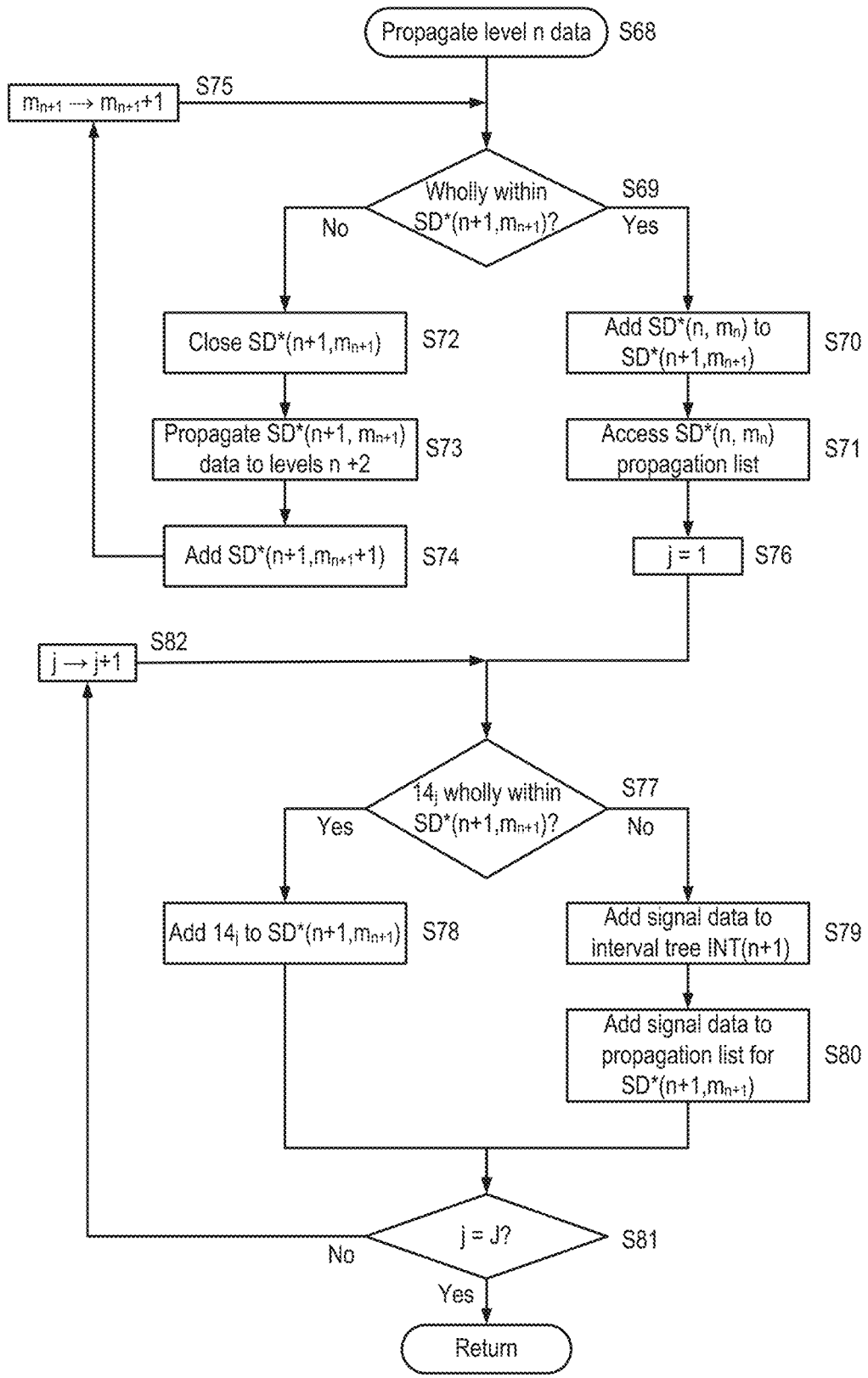
FIG. 21 shows a process flow diagram for a method of propagating data to higher levels within a tree structure as part of the method of FIG. 20.

Referring also to FIGS. 19 to 21, a third exemplary method of building the summary database SD is illustrated.

FIG. 19 schematically illustrates a summary node SD*(n,$m_n$) used in the third exemplary method. The summary node SD*(n,$m_n$) is the same as the summary node SD(n,$m_n$) shown in FIG. 10, except that the summary data structure SUM does not include carry-over count values $CO_j$, and that the summary node SD*(n,$m_n$) also includes a propagation list 15, for example in the form of signal data $14_1$, $14_2, \ldots, 14_1$ for a number J of signals (further explained hereinafter).

FIG. 20 shows a process flow diagram of the third exemplary method of building the summary database SD, and FIG. 21 shows a process flow diagram for a method of propagating data to higher levels n within the tree structure (used at step S65 in FIG. 20).

In the third exemplary method, each level of the summary database SD* tree structure includes one active summary node SD*(n,$m_n$) corresponding to the current maximum value of index $m_n$, and any number of closed summary nodes, SD*(n,$m_n$-1), SD*(n,$m_n$-2) and so forth. The active summary node SD*(n,$m_n$) at each level n is the most recent. In the third exemplary method, the auxiliary database AD* takes the form of a separate interval structure INT(n) corresponding to each level n of the summary database SD*, in the same way as for the summary database SD' built using the second method.

The third exemplary method of building the summary database follows detection of a signal (step S2) and determination of the signal data 14 (step S4) including the at least the signal start time $t_{start}$, the signal end time $t_{end}$, and the values of the one or more signal properties $p_1, p_2, \ldots, p_P$. The third exemplary method, like the second, avoids use of a summary buffer, but unlike the second keeps the processing focused on the leaf level n=0 until propagation of data to higher levels n>0 is needed. In some signal environments, in particular if a relatively larger number of signals require propagation to higher levels n, the third exemplary method avoids the need to frequently switch addressed memory locations compared to the second exemplary method. In such environments, the third exemplary method may have superior efficiency.

The signal data 14 is received (step S58), and it is tested whether or not the signal start $t_{start}$ and end $t_{end}$ of the signal are wholly within the leaf summary node period $\Delta t_S(n,m_n)$ of the active leaf summary node SD*(0,$m_o$) (step S59). If it is (step S59 Yes), then the signal property values $p_1$, $p_2, \ldots, p_P$ of the signal are added to the summary data structure SUM of the active leaf summary node SD*(o,$m_o$)

(step S60) and the processing returns to the next signal or buffer BuffR (step S7 in FIG. 2).

However, if the signal start $t_{start}$ and end $t_{end}$ of the signal are not wholly within the leaf summary node period $\Delta t_S(n, m_n)$ of the active leaf summary node SD*(0,$m_o$) (step S59|No), it is tested whether the end time $t_{end}$ of the signal is after the end $tS_{end}$(0,$m_o$) of the active leaf summary node SD*(0,$m_o$) (step S61). If it does not (step S61|No), i.e. if the start time $t_{start}$ is before the summary node period $\Delta t_S(n,m_n)$ of the active leaf summary node SD*(0,$m_o$), then the signal data 14 of the signal is added to the interval structure INT(n) corresponding to leaf n=0 (step S62) and the signal data 14 of the signal is also added to the propagation list 15 of the active leaf summary node SD*(0,$m_o$) (step S63).

Alternatively, if the signal start $t_{start}$ and end $t_{end}$ of the signal are not wholly within the leaf summary node period $\Delta t_S(n,m_n)$ of the active leaf summary node SD*(0,$m_o$) (step S59|No), and the end time $t_{end}$ of the signal is after the end $tS_{end}$(0,$m_o$) of the active leaf summary node SD*(0,$m_o$) (step S61|Yes), then the active leaf summary node SD*(o, $m_o$) is closed (step S64). This may involve saving/storing the active leaf summary node SD*(n,$m_n$) to one or more storage devices 6 and/or marking it as read-only, but equally may not require specific action beyond carrying out the following stages (steps S65 to S67). The summary data structure SUM of the leaf summary node SD*(o,$m_o$) is propagated to all higher level summary nodes SD*(n>0,$m_n$) from which the leaf summary node SD*(o,$m_o$) is a descendant (step S65). The propagation process may include adding new levels n and/or recursive propagation processes, and shall be explained further in relation to FIG. 21 hereinafter. A new active leaf summary node SD*(0, $m_o$+1) is added (step S66), and the index m, incremented to $m_o$+1 (step S67) before returning to the initial test (step S59) to determine whether the signal can fit within the updated active leaf summary node SD*(o,$m_o$) (recalling that $m_o$ has been incremented by one).

Referring in particular to FIG. 21 the propagation of summary node SD*(n,$m_n$) data to higher levels shall be described.

The method of propagation may be carried out relative to any level n, and indeed is carried out at step S73 of this method of FIG. 21. In other words, the process of propagation of data in summary nodes SD*(n,$m_n$) to higher levels n>0 may be recursive as needed.

Data is only propagated to the most recent summary node SD*(n,$m_n$) at each level n, with that node being added if necessary.

A command is received to propagate data of a node SD*(n,$m_n$) to higher levels (step S68). For example, this is applied to the active leaf summary node SD*(0,$m_o$) at step S65 in the third method shown in FIG. 20, and to the data of a summary node SD*(n+1,$m_{n+1}$) at step S73 of the propagation method shown in FIG. 21. The data to be propagated includes at least the summary data structure SUM, but may include further data in other examples.

It is tested whether the summary node time period $\Delta t_S(n, m_n)$ of the propagated node SD*(n,$m_n$) fits wholly within summary node time period $\Delta t_S(n+1,m_{n+1})$ of the most recent summary node SD*(n+1,$m_{n+1}$) at the next level up n+1 (step S69). In other words, whether $tS_{start}(n+1,m_{n+1}) < tS_{start}(n,m_n) < tS_{end}(n+1,m_{n+1})$ and $tS_{start}(n+1,m_{n+1}) < tS_{end}(n,m_n) < tS_{end}(n+1,m_n+)$. If a first summary node SD*(n+1,1) at the increased level n+1 does not exist, it is generated.

If the summary node time period $\Delta t_S(n,m_n)$ of the propagated node SD*(n,$m_n$) wholly fits (step S69|Yes), then the data from the propagated node SD*(n,$m_n$) is added to the node SD*(n+1,$m_n$+) (step S70). In other words, the summary data structure SUM of propagated node SD*(n,$m_n$) is added to the summary data structure SUM of node SD*(n+1,$m_{n+1}$). The propagation list 15 of the propagated node SD*(n,$m_n$) is then accessed (step S71) and processed (steps S76 though S82) as described hereinafter.

However, if the summary node time period $\Delta t_S(n,m_n)$ of the propagated node SD*(n,$m_n$) does not wholly fit within the summary node time period $\Delta t_S(n+1,m_{n+1})$ of the most recent summary node SD*(n+1,$m_{n+1}$) at the next level up n+1 (step S69|No), the most recent summary node SD*(n+1, $m_{n+1}$) at level n+1 is closed (step S72). This may involve writing the summary node SD*(n+1, $m_{n+1}$) to a storage device 6 or flagging as read only, but in practice may not require doing anything specific beyond carrying out the following steps (S73 to S74). The data in summary node SD*(n+1, $m_{n+1}$) is propagated to levels n+2 and higher (step S73), which is in practice a command (step S68) to propagate node SD*(n+1, $m_{n+1}$). Once data has been propagated to levels n+2 and higher (step S73), the most recent summary node SD*(n+1,$m_n$+) is shifted by adding the next summary node SD*(n+1,$m_{n+1}$+1) (step S74) and incrementing the index $m_{n+1} \rightarrow m_{n+1}+1$ (step S75) before returning to the initial test (step S69).

Returning to the processing of the propagation list 15 of a propagated node SD*(n,$m_n$) (steps S76 though S82), if a propagation list 15 contains an integer number J≥0 of signal data $14_1, 14_2, \ldots, 14_j, \ldots, 14_J$, then starting with the first j=1 (step S76), it is checked whether the signal corresponding to signal data $14_j$ fits wholly within the summary node time period $\Delta t_S(n+1,m_{n+1})$ of the most recent summary node SD*(n+1,$m_{n+1}$) at level n+1 (step S77). This amounts to checking, for the signal corresponding to signal data $14_j$, whether $tS_{start}(n+1,m_{n+1}) \leq tstart$ and $t_{end} \leq tS_{end}(n+1,m_{n+1})$. If it does (step S77|Yes), the signal properties $p_1, p_2, \ldots, p_P$ of the signal data $14_j$ are added to the summary data structure SUM of the active summary node SD*(n+1,$m_{n+1}$) (step S78).

However, if the signal corresponding to signal data $14_j$ does not fit wholly within the summary node time period $\Delta t_S(n+1,m_{n+1})$ of the most recent summary node SD*(n+1, $m_{n+1}$) at level n+1 (step S77|No), then the signal data $14_j$ of that signal is added to the interval structure INT(n+1) of the level n+1 (step S79) and the signal data $14_j$ of that signal is also added to the propagation list 15 of the summary node SD*(n+1,$m_{n+1}$) (step S80). If there are further signal data $14_j$ to process (step S81|No), then the index j is incremented to j+1 and the processing repeated (steps S77 to S81).

Alternatively, any other suitable method for propagating the summary data structures SUM to higher levels n may be used (provided that it does not result in double counting).

In this way, signal data 14 of signals which cannot fit into the summary nodes SD*(n,$m_n$) are any level n are stored in the propagations lists 15, and then subsequently added to the summary nodes SD*(n,$m_n$) at the first level n where they fit in the corresponding summary node time period $\Delta t_S(n+1, m_{n+1})$ during the process of propagating data to higher levels.

The summary databases SD* produced by the third exemplary method have the same structure as a summary database SD' produced by the second exemplary method, aside from the addition of propagation lists 15. Thus, a worked example similar to FIGS. 17A to 17C is not repeated. Searching a summary databases SD* produced by the third exemplary method have the same structure as a summary database SD' produced by the second exemplary method, and so the searching process may be the same as described in relation to FIG. 18.

MODIFICATIONS

It will be appreciated that various modifications may be made to the embodiments hereinbefore described. Such modifications may involve equivalent and other features which are already known in the design and use of methods and apparatuses for receiving, storing and/or processing time-series of data, and which may be used instead of or in addition to features already described herein. Features of one embodiment may be replaced or supplemented by features of another embodiment.

In some examples, the apparatus 3 may omit the communications interface 6, for example when only a local client 10 is required.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method comprising:
   receiving a time series of radio data;
   for each of a plurality of buffer periods, at the end of a most recently elapsed buffer period, analysing the radio data of that buffer period to detect signals;
   in response to detecting one or more signals ending within that buffer period:
      determining a start time and an end time of that signal, and one or more signal properties corresponding to that signal, the signal properties including at least a duration;
      storing that signal to a detailed database and a summary database;
   wherein the detailed database comprises a plurality of levels, each level comprising one or more detailed nodes, the detailed nodes within each level sub-dividing time into consecutive detailed node periods, wherein storing a signal to the detailed database comprises storing the signal properties corresponding to that signal into the lowest level available detailed node corresponding to a detailed node time period encompassing the start time and end time of that signal;
   wherein the summary database comprises an auxiliary database and a tree-structure of summary nodes having a plurality of levels, wherein the summary nodes at each level correspond to consecutive summary node periods of equal length, each summary node storing a summary data structure which stores, for each unique combination of quantised signal property values, a count of the number of signals corresponding to the respective summary node period which have that unique combination of quantised signal property values;
   wherein storing a signal to the summary database comprises, at each level of the summary database:
      updating, based on the signal properties, the summary data structures of one or more summary nodes having summary node periods overlapping the duration of that signal; or
      storing the signal properties corresponding to that signal in the auxiliary database.

2. The method of claim 1, wherein the time series of radio data is received and stored in real time, wherein the detection of signals and storage of detected signals to the detailed database and summary database occurs at the end of each buffer period without interrupting the reception and storage of the time series of radio data.

3. The method of claim 1, wherein the signal properties further include one of more of:
   a minimum frequency;
   a maximum frequency;
   a signal bandwidth;
   a centre frequency; and
   an integrated signal power.

4. The method of claim 1, wherein each detailed node stores up to a threshold number of signals.

5. The method of claim 4, wherein the threshold number of signals for each detailed node depends on the corresponding level of that detailed node.

6. The method of claim 4, wherein each level of the detailed database comprises one active detailed node having a node start time, and any number of closed detailed nodes, each having a node start time and a node end time defining the corresponding detailed node period;
   wherein storing a signal to the detailed database comprises:
      starting from the lowest level of the detailed database, searching successively increasing levels of the detailed database until an active detailed node at the searched level has a node start time before the start time of that signal, and in response:
      storing that signal to the active detailed node at the searched level; and
      in response to the active detailed node at the searched level is now storing a number of signals equal to the corresponding threshold number of signals:
         closing the active detailed node at the searched level, assigning the end time of that signal as the node end time; and
         opening a new active detailed node at the searched level, assigning the end time of that signal as the node start time.

7. The method of claim 1, wherein storing a signal to the detailed database further comprises storing the corresponding time series of radio data to the same detailed node as the signal properties.

8. The method of claim 1, wherein the summary database comprises, at the lowest level, up to a number $N_b$ of active leaf summary nodes corresponding to a summary buffer period, and any number of closed leaf summary nodes corresponding to earlier summary node periods;
   wherein storing a signal to the summary database comprises:
   a. in response to the start and end time of that signal are wholly within the summary buffer period, updating, based on the signal property values of that signal, the summary data structures of every active leaf summary node having a summary node period overlapping the duration of that signal;
   b. in response to the end time of that signal is within the summary buffer period and the start time of that signal is before the summary buffer period, storing the signal properties corresponding to the signal into the auxiliary database;

c. in response to the end time of that signal is after the summary buffer period:

closing the oldest active leaf summary node and propagating the corresponding summary data structure to all higher level summary nodes from which the oldest active leaf summary node is a descendant, wherein each summary node only counts that signal once in the respective summary data structure;

opening a new active leaf summary node as the most recent active leaf summary node in the summary buffer period;

d. wherein steps a. to c. are iterated until either:

the signal property values of the signal are added to every active leaf summary node having a summary node period overlapping the duration of that signal; or the signal properties corresponding to that signal are stored into the auxiliary database.

9. The method of claim 1, wherein each level of the summary database comprises one active summary node having a node start time, and any number of closed detailed nodes, wherein the active summary node is the most recent, each summary node having a node start time and a node end time defining the corresponding summary node period;

wherein the auxiliary database comprises an interval structure corresponding to each level of the summary database;

wherein storing a signal to the summary database comprises, starting from the lowest level, searching successively increasing levels of the summary database, at each level:

e. in response to the start and end time of that signal are within the summary node period corresponding to the active summary node at the searched level, adding the signal property values of that signal to the summary data structure of the active summary node at the searched level;

f. in response to the start time of that signal is within the summary node period corresponding to the active summary node at the searched level and the end time is outside the summary node period:

closing the active summary node at the searched level and propagating the corresponding summary data structure to all higher level summary nodes from which the active summary node at the searched level is a descendant;

opening a new active summary node at the searched level and returning to step e.;

g. in response to the end time of the signal is within the summary node period corresponding to the active summary node at the searched level and the start time is outside the summary node period:

adding the signal data to the interval structure corresponding to the searched level; and increasing the searched level by one.

10. The method of claim 1, wherein each level of the summary database comprises one active summary node having a node start time, and any number of closed detailed nodes, wherein the active summary node is the most recent, each summary node having a node start time and a node end time defining the corresponding summary node period;

wherein the auxiliary database comprises an interval structure corresponding to each level of the summary database;

wherein storing a signal to the summary database comprises:

h. in response to the start and end time of that signal are within the summary node period corresponding to the active leaf summary node, adding the signal property values of the signal to the summary data structure of the active leaf summary node;

i. in response to the start time of that signal is within the summary node period corresponding to the active summary node at the searched level and the end time is outside the summary node period:

closing the active recent leaf summary node and propagating the corresponding summary data structure to all higher level summary nodes from which the active leaf summary node is a descendant;

opening a new active leaf summary node and returning to step h.;

j. in response to the end time of the signal is within the summary node period corresponding to the active summary node at the searched level and the start time is outside the summary node period:

adding the signal data to the interval structure corresponding to the leaf level; and adding the signal data to a propagation list stored in the active leaf summary node.

11. The method of claim 10, wherein propagating the corresponding summary data structure to all higher level summary nodes from which the active leaf summary node is a descendant comprises, at each level:

in response to receiving a propagation list from the descendant level, for each signal stored in the propagation list:

in response to the start and end time of that signal being within the summary node period of the active summary node at that level, adding the signal property values of that signal to the corresponding summary data structure; or in response to the start and end time of that signal not being within the summary node period of the active summary node at that level, adding that signal to the propagation list of the active summary node at that level and to the interval corresponding to that level.

12. The method of claim 1, wherein each summary node and each detailed node is read only once the current time is after the corresponding respective node period.

13. The method of claim 1, the method further comprising:

receiving a query comprising query fields, the query fields comprising a query start time, a query end time and one or more ranges of signal properties;

in response to meeting a condition based on the query fields, processing the query using the summary nodes of the summary database;

in response to not meeting the condition based on the query fields, processing the query using the detailed nodes of the detailed database.

14. A method of querying a detailed database and summary database storing a plurality of signals detected in a time series of radio data, each signal having a start time, an end time of that signal, and one or more signal properties including at least a duration;

wherein the detailed database comprises a plurality of levels, each level comprising one or more detailed nodes, the detailed nodes within each level sub-dividing time into consecutive detailed node periods, wherein the signal properties corresponding to each signal are stored in the lowest level available detailed node corresponding to a detailed node time period encompassing the start time and end time of that signal;

wherein the summary database comprises an auxiliary database and a tree-structure of summary nodes having a plurality of levels, wherein the summary nodes at each level correspond to consecutive summary node periods of equal length, each summary node storing a summary data structure which stores, for each unique combination of quantised signal property values of the plurality of signals, a count of the number of signals corresponding to the respective summary node period which have that unique combination of quantised signal property values the method of querying a detailed database and summary database comprising:

receiving a query comprising query fields, the query fields comprising a query start time, a query end time and one or more ranges of signal properties, wherein the difference between the query start time and the query end time is a query time period;

in response to meeting a condition based on the query fields, processing the query using the summary database;

in response to not meeting the condition based on the query fields, processing the query using the detailed database.

15. The method of claim 14, wherein the condition comprises whether the query time period exceeds a query period threshold.

16. The method of claim 14, wherein processing the query using the detailed database comprises:

starting from the lowest level of the detailed database, searching successively increasing levels of the detailed database and adding to a detailed query result each signal which matches all the query fields;

outputting the detailed query result.

17. The method of claim 14, wherein processing the query using the summary database comprises:

determining, based on the query time period, a query processing level of the summary database;

for each summary node at the query processing level having a summary node period overlapping the query time period, adding any entry in the corresponding summary data structure which matches the query fields to a summary query result;

searching the auxiliary database and adding any signal matching the query fields to the summary query result;

outputting the summary query result.

18. Apparatus configured:

to receive a time series of radio data;

for each of a plurality of buffer periods, at the end of a most recently elapsed buffer period, to analyse the radio data of that buffer period to detect signals;

in response to detecting one or more signals ending within that buffer period:

to determine a start time and an end time of that signal, and one or more signal properties corresponding to that signal, the signal properties including at least a duration;

to store that signal to a detailed database and a summary database;

wherein the detailed database comprises a plurality of levels, each level comprising one or more detailed nodes, the detailed nodes within each level sub-dividing time into consecutive detailed node periods, wherein storing a signal to the detailed database comprises storing the signal properties corresponding to that signal into the lowest level available detailed node corresponding to a detailed node period encompassing the start time and end time of that signal;

wherein the summary database comprises an auxiliary database and a tree-structure of summary nodes having a plurality of levels, wherein the summary nodes at each level correspond to consecutive summary node periods of equal length, each summary node storing a summary data structure which stores, for each unique combination of quantised signal property values, a count of the number of signals corresponding to the respective summary node period which have that unique combination of quantised signal property values;

wherein storing a signal to the summary database comprises, at each level of the summary database:

updating, based on the signal properties, the summary data structures of one or more summary nodes having summary node periods overlapping the duration of that signal; or storing the signal properties corresponding to that signal in the auxiliary database.

19. The apparatus of claim 18, comprising one or more radios configured to receive the time series of radio data.

20. The method of claim 6, wherein each level of the summary database comprises one active summary node having a node start time, and any number of closed detailed nodes, wherein the active summary node is the most recent, each summary node having a node start time and a node end time defining the corresponding summary node period;

wherein the auxiliary database comprises an interval structure corresponding to each level of the summary database;

wherein storing a signal to the summary database comprises, starting from the lowest level, searching successively increasing levels of the summary database, at each level:

e. in response to the start and end time of that signal are within the summary node period corresponding to the active summary node at the searched level, adding the signal property values of that signal to the summary data structure of the active summary node at the searched level;

f. in response to the start time of that signal is within the summary node period corresponding to the active summary node at the searched level and the end time is outside the summary node period:

closing the active summary node at the searched level and propagating the corresponding summary data structure to all higher level summary nodes from which the active summary node at the searched level is a descendant;

opening a new active summary node at the searched level and returning to step e.;

g. in response to the end time of the signal is within the summary node period corresponding to the active summary node at the searched level and the start time is outside the summary node period:

adding the signal data to the interval structure corresponding to the searched level; and increasing the searched level by one.

* * * * *